US012661767B2

(12) United States Patent
Sareault et al.

(10) Patent No.: US 12,661,767 B2
(45) Date of Patent: Jun. 23, 2026

(54) CYLINDRICAL INTEGRATED VALVE ASSEMBLY

(71) Applicant: Black & Decker Inc., New Britain, CT (US)

(72) Inventors: James Sareault, Walpole, MA (US); Jonathan W. Fairbanks, Coventry, RI (US); Jonathan D. Kalow, East Greenwich, RI (US); Wai J. Ho, Providence, RI (US)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 15/627,450

(22) Filed: Jun. 20, 2017

(65) Prior Publication Data

US 2017/0361443 A1 Dec. 21, 2017

Related U.S. Application Data

(60) Provisional application No. 62/352,515, filed on Jun. 20, 2016, provisional application No. 62/352,477, (Continued)

(51) Int. Cl.
*B25C 1/04* (2006.01)
*B25C 1/00* (2006.01)
(Continued)

(52) U.S. Cl.
CPC .............. *B25C 1/043* (2013.01); *B25C 1/008* (2013.01); *B25C 1/041* (2013.01); *B25C 5/1665* (2013.01)

(58) Field of Classification Search
CPC .......... B25C 1/043; B25C 1/041; F16K 39/02
(Continued)

(56) References Cited

U.S. PATENT DOCUMENTS 618,085 A 1/1899 Grandy
1,727,383 A 9/1929 Simonides
(Continued)

FOREIGN PATENT DOCUMENTS

CA 2524765 A1 4/2006
CN 1846947 A 10/2006
(Continued)

OTHER PUBLICATIONS

Extended European Search Report, Application No. 17161681.6-1019 / 3213872, EPO (Aug. 2, 2018).
(Continued)

*Primary Examiner* — Shelley M Self
*Assistant Examiner* — Patrick B Fry
(74) *Attorney, Agent, or Firm* — Wright IP & International Law; Eric G. Wright

(57) ABSTRACT

A pneumatic fastening tool that has an integrated valve assembly. The integrated valve assembly can have a cylindrical valve assembly housing that can house a portion of a head valve assembly and can also house at least a portion of a trigger valve assembly. The head valve assembly can have a head valve body that can be maintained in a resting state by compressed air. The compressed air that maintains the resting stat of the head valve assembly can be provided by one or more passages formed in the valve assembly housing. The valve assembly housing can also guide the movement of the valve head body when the trigger valve assembly is actuated causing a fastener to be driven into a workpiece. The valve assembly housing can have a circular exhaust seal and a cylindrical exhaust chamber through which compressed air can be exhausted after the driving of a fastener into a work piece.

12 Claims, 11 Drawing Sheets

Related U.S. Application Data filed on Jun. 20, 2016, provisional application No. 62/352,541, filed on Jun. 20, 2016, provisional application No. 62/352,547, filed on Jun. 20, 2016.

(51) Int. Cl.
*B25C 5/16* (2006.01)
*F16K 39/02* (2006.01)

(58) Field of Classification Search
USPC ............ 137/489.5; 227/8, 130; 91/308, 416, 91/422, 461
See application file for complete search history.

(56) References Cited

U.S. PATENT DOCUMENTS 2,106,034 A 1/1938 Mall
2,398,544 A 4/1946 Lockhart
2,417,490 A 3/1947 Hewes
2,519,617 A 8/1950 Wember
2,522,931 A 9/1950 Curtiss
2,569,221 A 9/1951 Batten
2,580,631 A 1/1952 Whitledge
2,630,784 A 3/1953 Wallerstein, Jr.
2,646,729 A 7/1953 Godenir
2,733,440 A 2/1956 Jenny
2,768,244 A 10/1956 Tiger
3,086,207 A 4/1963 Ingle et al.
3,099,837 A 8/1963 Heilman et al.
3,180,435 A 4/1965 McHenry
3,193,049 A 7/1965 Wollek
3,205,721 A 9/1965 Speer
3,205,972 A 9/1965 Stricker et al.
3,228,422 A * 1/1966 Bade ...................... B25C 1/043 137/625.6
3,302,047 A 1/1967 Short
3,386,527 A 6/1968 Daubert et al.
3,498,517 A 3/1970 Novak
3,524,576 A 8/1970 Bader
3,563,438 A 2/1971 Doyle et al.
3,584,776 A 6/1971 Bolte
3,622,062 A 11/1971 Goode, Jr. et al.
3,653,299 A * 4/1972 Howard .................. B25C 1/041 91/416
3,708,095 A 1/1973 Briggs, Jr.
3,711,008 A 1/1973 Clifford et al.
3,713,573 A * 1/1973 Fehrs ...................... B25C 1/043 227/8
3,812,726 A 5/1974 Bell
3,829,722 A 8/1974 Rosenthal, Jr. et al.
3,858,780 A 1/1975 Perkins et al.
3,858,781 A 1/1975 Obergfell et al.
3,908,884 A 9/1975 Schrepferman
4,042,036 A 8/1977 Smith et al.
4,053,094 A 10/1977 Males
4,107,591 A 8/1978 Herr et al.
4,107,604 A 8/1978 Bernier
4,121,745 A 10/1978 Smith et al.
4,129,240 A 12/1978 Geist
4,166,507 A 9/1979 Bouyoucos et al.
4,189,080 A 2/1980 Smith et al.
4,197,974 A 4/1980 Morton et al.
4,204,622 A 5/1980 Smith et al.
4,253,598 A 3/1981 Haytayan
4,319,705 A 3/1982 Geist et al.
4,323,127 A 4/1982 Cunningham
4,346,205 A 8/1982 Hiles
4,404,894 A * 9/1983 Oesterle .................. B25C 1/043 137/625.69
4,423,970 A 1/1984 Potter
4,463,888 A 8/1984 Geist et al.
4,519,535 A 5/1985 Crutcher
4,544,090 A 10/1985 Warman et al.
4,558,747 A 12/1985 Cunningham
4,562,589 A 12/1985 Warnaka et al.
4,597,517 A 7/1986 Wagdy
4,601,408 A 7/1986 Billing et al.
4,624,401 A 11/1986 Gassner et al.
4,688,710 A * 8/1987 Massari, Jr. ............ B25C 1/041 227/123
4,784,308 A 11/1988 Novak et al.
4,825,596 A 5/1989 Kinner
4,829,248 A 5/1989 Loubier
4,832,245 A 5/1989 Terayama et al.
4,854,492 A 8/1989 Houck et al.
4,858,812 A 8/1989 Fealey
4,897,914 A 2/1990 Loubier
4,909,419 A 3/1990 Yamada et al.
4,928,868 A 5/1990 Kerrigan
4,964,558 A 10/1990 Crutcher et al.
4,966,041 A 10/1990 Miyazaki
4,981,373 A 1/1991 Bando
4,981,737 A 1/1991 Rico
5,069,379 A 12/1991 Kerrigan
5,083,694 A 1/1992 Lemos
5,098,004 A 3/1992 Kerrigan
5,131,579 A 7/1992 Okushima et al.
5,135,152 A 8/1992 Uno et al.
5,197,647 A 3/1993 Howell
5,216,823 A 6/1993 Ripley
5,231,750 A 8/1993 Fealey
5,263,842 A 11/1993 Fealey
5,266,917 A 11/1993 Bleeke et al.
5,297,713 A 3/1994 Perra et al.
5,363,569 A 11/1994 Kadakia
5,433,367 A 7/1995 Liu
5,436,516 A 7/1995 Yamazaki et al.
5,443,196 A 8/1995 Burlington
5,493,216 A 2/1996 Asa
5,511,715 A 4/1996 Crutcher et al.
5,603,595 A 2/1997 Nygren, Jr.
5,605,268 A 2/1997 Hayashi et al.
5,624,150 A 4/1997 Venier
5,647,525 A 7/1997 Ishizawa
5,669,542 A * 9/1997 White ..................... B25C 1/042 227/130
5,683,024 A 11/1997 Eminger et al.
5,723,923 A 3/1998 Clagett
5,813,588 A 9/1998 Lin
5,829,660 A * 11/1998 White ..................... B25C 1/041 227/8
5,848,655 A 12/1998 Cooper et al.
5,865,360 A * 2/1999 White ..................... B25C 1/043 227/130
5,873,509 A 2/1999 Liao
5,911,351 A * 6/1999 White ..................... B25C 1/043 227/130
5,924,621 A * 7/1999 Hung ...................... B25C 1/043 227/130
6,006,975 A 12/1999 Ishizawa
6,012,622 A 1/2000 Weinger et al.
6,036,072 A 3/2000 Lee
6,053,389 A 4/2000 Chu et al.
6,123,241 A 9/2000 Walter et al.
6,131,787 A 10/2000 Curtis
6,192,769 B1 2/2001 Stark et al.
6,196,332 B1 3/2001 Albert et al.
6,199,739 B1 3/2001 Mukoyama et al.
6,213,371 B1 4/2001 Cabrera
6,237,747 B1 5/2001 Gantner et al.
6,274,953 B1 8/2001 Hwang et al.
6,290,115 B1 9/2001 Chen
6,296,167 B1 10/2001 Jen
6,422,447 B1 7/2002 White et al.
6,425,306 B1 7/2002 Habermehl
6,431,430 B1 8/2002 Jalbert et al.
6,464,306 B2 10/2002 Shaw et al.
6,499,642 B1 12/2002 Amada
6,499,643 B1 12/2002 Hewitt
6,604,666 B1 8/2003 Pedicini et al.
6,641,022 B2 11/2003 Hamano et al.
6,679,413 B2 1/2004 Miller et al.
6,705,503 B1 3/2004 Pedicini et al.
6,739,490 B1 5/2004 Shkolnikov et al.

(56) References Cited

U.S. PATENT DOCUMENTS

| | | | | |
|---|---|---|---|---|
| 6,755,807 | B2 | 6/2004 | Risk, Jr. et al. | |
| 6,772,931 | B2 | 8/2004 | Miller et al. | |
| 6,796,475 | B2 | 9/2004 | Adams | |
| 6,796,476 | B2 | 9/2004 | Birk et al. | |
| 6,824,533 | B2 | 11/2004 | Risk, Jr. et al. | |
| 6,828,020 | B2 | 12/2004 | Fisher et al. | |
| 6,880,739 | B1 | 4/2005 | Zhu | |
| 6,892,921 | B2 | 5/2005 | Beville | |
| 6,894,595 | B2 | 5/2005 | Howell | |
| 6,938,812 | B2 | 9/2005 | Miller et al. | |
| 6,971,567 | B1 | 12/2005 | Cannaliato et al. | |
| 7,091,635 | B1 | 8/2006 | Gilliland et al. | |
| 7,137,541 | B2 | 11/2006 | Baskar et al. | |
| 7,138,595 | B2 | 11/2006 | Berry et al. | |
| 7,162,804 | B2 | 1/2007 | Matsuura | |
| 7,165,305 | B2 | 1/2007 | Kenney et al. | |
| 7,204,403 | B2 | 4/2007 | Kenney et al. | |
| 7,213,732 | B2 | 5/2007 | Schell et al. | |
| 7,213,733 | B1 | 5/2007 | Wen | |
| 7,225,961 | B1 * | 6/2007 | Lee | B25C 1/043 227/130 |
| 7,243,831 | B2 | 7/2007 | Ishizawa et al. | |
| 7,285,877 | B2 | 10/2007 | Gorti et al. | |
| 7,314,155 | B2 | 1/2008 | Moeller et al. | |
| 7,322,506 | B2 | 1/2008 | Forster | |
| 7,325,712 | B2 | 2/2008 | Schiestl | |
| 7,331,403 | B2 | 2/2008 | Berry et al. | |
| 7,410,085 | B2 | 8/2008 | Wolf et al. | |
| 7,500,589 | B2 | 3/2009 | Wolf et al. | |
| 7,503,401 | B2 | 3/2009 | Gross et al. | |
| 7,513,404 | B2 | 4/2009 | Shkolnikov et al. | |
| 7,520,414 | B2 | 4/2009 | Blessing et al. | |
| 7,532,096 | B2 | 5/2009 | Zindler | |
| 7,537,146 | B2 | 5/2009 | Schiestl | |
| 7,575,142 | B2 | 8/2009 | Liang et al. | |
| 7,594,547 | B2 | 9/2009 | Berry et al. | |
| 7,619,499 | B2 | 11/2009 | Wieler et al. | |
| 7,641,089 | B2 | 1/2010 | Schell et al. | |
| 7,686,199 | B2 | 3/2010 | Gross et al. | |
| 7,694,863 | B2 | 4/2010 | Spasov et al. | |
| 7,699,201 | B2 | 4/2010 | Hagan et al. | |
| 7,726,536 | B2 | 6/2010 | Gross et al. | |
| 7,762,443 | B2 | 7/2010 | Tamura et al. | |
| 7,766,204 | B2 | 8/2010 | Spasov et al. | |
| 7,777,482 | B2 | 8/2010 | Munz et al. | |
| 7,789,169 | B2 | 9/2010 | Berry et al. | |
| 7,793,811 | B1 | 9/2010 | Pedicini et al. | |
| 7,810,688 | B2 | 10/2010 | Wu et al. | |
| 7,861,905 | B2 | 1/2011 | Miescher et al. | |
| 7,870,988 | B2 | 1/2011 | Schiestl et al. | |
| 7,922,059 | B2 | 4/2011 | Schiestl et al. | |
| 7,942,651 | B2 | 5/2011 | Bin-Nun et al. | |
| 7,975,893 | B2 | 7/2011 | Berry et al. | |
| 7,980,439 | B2 | 7/2011 | Akiba et al. | |
| 7,997,467 | B2 | 8/2011 | Hirabayashi et al. | |
| 8,006,881 | B2 | 8/2011 | Arata et al. | |
| 8,011,549 | B2 | 9/2011 | Berry et al. | |
| 8,047,415 | B2 | 11/2011 | Kunz et al. | |
| 8,079,504 | B1 | 12/2011 | Pedicini et al. | |
| 8,088,406 | B2 | 1/2012 | Potter et al. | |
| 8,096,456 | B2 | 1/2012 | Kunz et al. | |
| 8,123,099 | B2 | 2/2012 | Kenney et al. | |
| 8,132,702 | B2 | 3/2012 | Kunz et al. | |
| 8,210,409 | B2 | 7/2012 | Hirabayashi | |
| 8,231,039 | B2 | 7/2012 | Buck et al. | |
| 8,302,833 | B2 | 11/2012 | Gross et al. | |
| 8,336,748 | B2 | 12/2012 | Hlinka et al. | |
| RE44,001 | E | 2/2013 | Pedicini et al. | |
| 8,381,960 | B2 | 2/2013 | Bruggmueller et al. | |
| 8,397,967 | B2 | 3/2013 | Calvet et al. | |
| 8,485,407 | B2 | 7/2013 | Liu et al. | |
| 8,523,035 | B2 | 9/2013 | Pedicini et al. | |
| 8,534,527 | B2 | 9/2013 | Brendel et al. | |
| 8,550,324 | B2 | 10/2013 | Coleman | |
| 8,555,997 | B2 | 10/2013 | Carrier et al. | |

| | | | |
|---|---|---|---|
| 8,602,283 | B2 | 12/2013 | Tamura et al. |
| 8,746,526 | B2 | 6/2014 | Hlinka et al. |
| 8,763,874 | B2 | 7/2014 | McCardle et al. |
| 9,065,305 | B2 | 6/2015 | Trinkner |
| 9,248,539 | B2 | 2/2016 | Tajima |
| 9,346,158 | B2 | 5/2016 | Garber et al. |
| 9,469,021 | B2 | 10/2016 | Gregory et al. |
| 9,473,053 | B2 | 10/2016 | Lim et al. |
| 9,498,871 | B2 | 11/2016 | Gregory et al. |
| 9,566,692 | B2 | 2/2017 | Seith et al. |
| 9,643,305 | B2 | 5/2017 | Gregory et al. |
| 9,649,755 | B2 | 5/2017 | Gregory et al. |
| 9,808,924 | B2 | 11/2017 | Wu |
| 9,815,160 | B2 | 11/2017 | Nitsche et al. |
| 9,827,658 | B2 | 11/2017 | Gregory et al. |
| 10,022,848 | B2 | 7/2018 | Gross et al. |
| 10,406,662 | B2 | 9/2019 | Leh et al. |
| 10,414,033 | B2 | 9/2019 | Ekstrom et al. |
| 10,434,634 | B2 | 10/2019 | Garber |
| 10,882,166 | B2 | 1/2021 | Asplund |
| 10,888,981 | B2 | 1/2021 | Gregory et al. |
| 11,179,836 | B2 | 11/2021 | Gregory et al. |
| 11,229,995 | B2 | 1/2022 | Gregory et al. |
| 12,151,348 | B2 | 11/2024 | Gregory et al. |
| 12,208,497 | B2 | 1/2025 | Gregory et al. |
| 2002/0007559 | A1 | 1/2002 | Morabit et al. |
| 2002/0053587 | A1 | 5/2002 | White et al. |
| 2002/0060233 | A1 | 5/2002 | Akiba |
| 2002/0117893 | A1 | 8/2002 | Shaw et al. |
| 2002/0158103 | A1 | 10/2002 | Driscoll et al. |
| 2003/0000990 | A1 | 1/2003 | White et al. |
| 2003/0030682 | A1 | 2/2003 | Kim et al. |
| 2003/0042285 | A1 | 3/2003 | Wang |
| 2003/0066858 | A1 | 4/2003 | Holgersson |
| 2003/0230621 | A1 | 12/2003 | Yamamoto et al. |
| 2003/0230622 | A1 | 12/2003 | Rotharmel |
| 2004/0189284 | A1 | 9/2004 | Haubold et al. |
| 2004/0219322 | A1 | 11/2004 | Fisher et al. |
| 2004/0232194 | A1 | 11/2004 | Pedicini et al. |
| 2005/0000998 | A1 | 1/2005 | Grazioli et al. |
| 2005/0029391 | A1 | 2/2005 | Cocciadiferro et al. |
| 2005/0050712 | A1 | 3/2005 | Lat et al. |
| 2005/0217874 | A1 | 10/2005 | Forster et al. |
| 2005/0217875 | A1 | 10/2005 | Forster et al. |
| 2005/0218175 | A1 | 10/2005 | Schell et al. |
| 2005/0218176 | A1 | 10/2005 | Schell et al. |
| 2005/0218183 | A1 | 10/2005 | Berry et al. |
| 2005/0218186 | A1 | 10/2005 | Forster |
| 2005/0220445 | A1 | 10/2005 | Baskar et al. |
| 2005/0289264 | A1 | 12/2005 | Illowsky et al. |
| 2006/0000863 | A1 | 1/2006 | McGee et al. |
| 2006/0011694 | A1 | 1/2006 | Ishizawa et al. |
| 2006/0016843 | A1 | 1/2006 | Ishizawa et al. |
| 2006/0078438 | A1 | 4/2006 | Wood |
| 2006/0091179 | A1 | 5/2006 | Moeller et al. |
| 2006/0155582 | A1 | 7/2006 | Brown |
| 2006/0161111 | A1 | 7/2006 | Potter et al. |
| 2006/0169738 | A1 | 8/2006 | Ogawa et al. |
| 2006/0243020 | A1 | 11/2006 | Herod |
| 2006/0249554 | A1 | 11/2006 | Butzen et al. |
| 2006/0261125 | A1 | 11/2006 | Schiestl |
| 2007/0037102 | A1 | 2/2007 | Mowry |
| 2007/0075112 | A1 | 4/2007 | Porth et al. |
| 2007/0108029 | A1 | 5/2007 | Wieler et al. |
| 2007/0210133 | A1 | 9/2007 | Oda et al. |
| 2008/0006670 | A1 | 1/2008 | Wen |
| 2008/0099526 | A1 | 5/2008 | Brendel et al. |
| 2008/0112056 | A1 | 5/2008 | Raymond et al. |
| 2008/0223900 | A1 | 9/2008 | Tanji |
| 2008/0251567 | A1 | 10/2008 | Shkolnikov et al. |
| 2008/0302846 | A1 | 12/2008 | Thompson |
| 2008/0308597 | A1 | 12/2008 | Wojcicki |
| 2009/0025701 | A1 | 1/2009 | Douglas et al. |
| 2009/0030442 | A1 | 1/2009 | Potter et al. |
| 2009/0032567 | A1 | 2/2009 | Liang et al. |
| 2009/0050667 | A1 | 2/2009 | Po |
| 2009/0057365 | A1 | 3/2009 | Murayama et al. |
| 2009/0057366 | A1 | 3/2009 | Braddock |
| 2009/0095787 | A1 | 4/2009 | Liang et al. |

(56) References Cited

U.S. PATENT DOCUMENTS

| | | | |
|---|---|---|---|
| 2009/0183888 | A1 | 7/2009 | Forster et al. |
| 2009/0194573 | A1 | 8/2009 | Liang et al. |
| 2009/0200354 | A1 | 8/2009 | Arata et al. |
| 2009/0250500 | A1 | 10/2009 | Brendel et al. |
| 2009/0275273 | A1 | 11/2009 | Purohit et al. |
| 2009/0294505 | A1 | 12/2009 | Kunz et al. |
| 2009/0294508 | A1 | 12/2009 | Kunz et al. |
| 2009/0321098 | A1 | 12/2009 | Hull et al. |
| 2009/0321492 | A1 | 12/2009 | Shima et al. |
| 2010/0095645 | A1 | 4/2010 | Tippery et al. |
| 2010/0206934 | A1 | 8/2010 | Vallon et al. |
| 2010/0213232 | A1 | 8/2010 | Krondorfer et al. |
| 2010/0213236 | A1 | 8/2010 | Zhang et al. |
| 2010/0289484 | A1 | 11/2010 | Quinn |
| 2011/0062207 | A1 | 3/2011 | Hlinka et al. |
| 2011/0132959 | A1 | 6/2011 | Hlinka et al. |
| 2011/0139478 | A1 | 6/2011 | Brennenstuhl et al. |
| 2011/0180284 | A1 | 7/2011 | Carrier et al. |
| 2011/0248062 | A1 | 10/2011 | Fujimoto |
| 2011/0259938 | A1 | 10/2011 | Chien et al. |
| 2012/0001505 | A1 | 1/2012 | Henke et al. |
| 2012/0097729 | A1 | 4/2012 | Gross et al. |
| 2012/0124988 | A1 | 5/2012 | Nelson et al. |
| 2012/0187178 | A1 | 7/2012 | Campbell |
| 2012/0255749 | A1 | 10/2012 | Seith et al. |
| 2013/0021346 | A1 | 1/2013 | Terman |
| 2013/0030436 | A1 | 1/2013 | LeCronier et al. |
| 2013/0052594 | A1 | 2/2013 | Carroll-Yacoby et al. |
| 2013/0186221 | A1 | 7/2013 | Weiberle et al. |
| 2013/0192432 | A1 | 8/2013 | Barker |
| 2013/0233903 | A1 | 9/2013 | Brendel et al. |
| 2013/0320059 | A1 | 12/2013 | Gregory et al. |
| 2013/0320060 | A1 | 12/2013 | Gregory et al. |
| 2013/0320063 | A1 | 12/2013 | Gregory et al. |
| 2013/0320064 | A1 | 12/2013 | Gregory et al. |
| 2013/0320066 | A1 | 12/2013 | Gregory et al. |
| 2013/0320067 | A1 | 12/2013 | Gregory et al. |
| 2013/0320068 | A1 | 12/2013 | Gregory et al. |
| 2014/0054350 | A1 | 2/2014 | Pedicini |
| 2014/0076952 | A1 | 3/2014 | Garber et al. |
| 2014/0100687 | A1 | 4/2014 | Ekstrom et al. |
| 2014/0161412 | A1 | 6/2014 | Chase et al. |
| 2014/0263424 | A1 | 9/2014 | Fortuna |
| 2014/0360744 | A1 | 12/2014 | Lawrence |
| 2015/0053736 | A1 | 2/2015 | Pomeroy et al. |
| 2015/0096776 | A1 | 4/2015 | Garber |
| 2015/0251240 | A1 | 9/2015 | LeMieux |
| 2015/0357061 | A1 | 12/2015 | Ales et al. |
| 2016/0023341 | A1 | 1/2016 | Gross et al. |
| 2016/0023342 | A1 | 1/2016 | Koenig et al. |
| 2017/0028537 | A1 | 2/2017 | McClung et al. |
| 2017/0066116 | A1 | 3/2017 | Garber et al. |
| 2017/0113334 | A1 | 4/2017 | Seith et al. |
| 2017/0247060 | A1 | 8/2017 | Jarvis et al. |
| 2017/0361442 | A1 | 12/2017 | Fairbanks et al. |
| 2017/0361443 | A1 | 12/2017 | Sareault et al. |
| 2018/0054102 | A1 | 2/2018 | Mizukami et al. |
| 2018/0071904 | A1 | 3/2018 | Gregory et al. |
| 2018/0085904 | A1 | 3/2018 | Gregory et al. |
| 2018/0126529 | A1 | 5/2018 | Pomeroy et al. |
| 2018/0222310 | A1 | 8/2018 | Berlinger, Jr. et al. |
| 2018/0361560 | A1 | 12/2018 | Chen et al. |
| 2019/0366527 | A1 | 12/2019 | Akiba |
| 2020/0039037 | A1 | 2/2020 | McClung et al. |
| 2020/0039044 | A1 | 2/2020 | Akiba |
| 2020/0114501 | A1 | 4/2020 | Mashiko et al. |
| 2020/0306942 | A1 | 10/2020 | Koenig et al. |
| 2021/0107125 | A1 | 4/2021 | Gregory et al. |
| 2021/0109134 | A1 | 4/2021 | Suzuki |
| 2021/0222684 | A1 | 7/2021 | Zhu et al. |
| 2021/0354278 | A1 | 11/2021 | Lai et al. |
| 2022/0080571 | A1 | 3/2022 | Gregory et al. |
| 2022/0118593 | A1 | 4/2022 | Gregory et al. |
| 2022/0173633 | A1 | 6/2022 | Heizmann et al. |
| 2024/0100669 | A1 | 3/2024 | Gregory et al. |
| 2025/0050481 | A1 | 2/2025 | Gregory et al. |
| 2025/0135613 | A1 | 5/2025 | Gregory et al. |

FOREIGN PATENT DOCUMENTS

| | | | |
|---|---|---|---|
| CN | 101032813 | A | 9/2007 |
| CN | 102900806 | A | 1/2013 |
| EP | 0230050 | A1 | 7/1987 |
| EP | 0387211 | A2 | 9/1990 |
| EP | 0663269 | A1 | 7/1995 |
| EP | 0927605 | A2 | 7/1999 |
| EP | 2002935 | A2 | 12/2008 |
| EP | 2127818 | A1 | 12/2009 |
| EP | 2127819 | A1 | 12/2009 |
| EP | 2230050 | A1 | 9/2010 |
| EP | 2527095 | A1 | 11/2012 |
| EP | 2711135 | A2 | 3/2014 |
| EP | 2979821 | A1 | 2/2016 |
| EP | 3181294 | A1 | 6/2017 |
| GB | 1438264 | | 6/1976 |
| JP | S6135247 | U | 3/1986 |
| JP | 4101078 | A | 4/1992 |
| JP | H04331848 | A | 11/1992 |
| JP | 2007167986 | A | 7/2007 |
| JP | 5620772 | B2 | 11/2014 |
| WO | 2004052595 | A1 | 6/2004 |
| WO | 2007126735 | A2 | 11/2007 |

OTHER PUBLICATIONS

Extended European Search Report, Application No. 17161682.4-1019 / 3213873, EPO (Jul. 13, 2018).

Extended European Search Report, Application No. 13170116.1-1019 / 2669058, EPO (Mar. 20, 2018).

Extended European Search Report, Application No. 13170109.6-1701 / 2669055, EPO (Jun. 2, 2016).

Extended European Search Report, Application No. 13170119.5-1701 / 2669059, EPO (Apr. 29, 2016).

Extended European Search Report, Application No. 14187710.0-1701, EPO (Oct. 15, 2015).

Communication Pursuant To Article 94(3) EPC, Application No. 16194343.6-1019, EPO (Aug. 29, 2018).

Extended European Search Report, Application No. 16194343.6-1701 / 3181294, EPO (May 24, 2017).

Communication Pursuant To Article 94(3) EPC, Application No. 13 170 106.2-1019, EPO (Mar. 26, 2019).

Communication Pursuant To Article 94(3) EPC, Application No. 13 170 108.8-1019, EPO (Mar. 13, 2019).

Extended European Search Report, Application No. 13 170 097.3-1019 / 2716408, EPO (Mar. 15, 2018).

Extended European Search Report, Application No. 15 178 620.9-1701, EPO (Dec. 1, 2015).

PCT International Search Report, Application No. PCT/CN2015/076257, ISA (Jun. 29, 2015).

Communication Pursuant To Article 94(3) EPC, EP Application No. 13 170 113.8-1019, EPO (Oct. 25, 2018).

Communication Pursuant To Article 94(3) EPC, EP Application No. 13 170 109.6-1019, EPO (Oct. 25, 2018).

Extended European Search Report, Application No. 13170108.8-1701/2669054, EPO (Jun. 22, 2016).

Extended European Search Report, Application No. 13170106.2-1701/2669053, EPO (May 20, 2016).

Extended European Search Report, Application No. 15827030.6-1019/3174667, EPO (Mar. 2, 2018).

* cited by examiner

CYLINDRICAL INTEGRATED VALVE ASSEMBLY

CROSS-REFERENCE TO RELATED APPLICATIONS

This patent application is a non-provisional application of and claims the benefit of the filing date of each of the following: copending U.S. provisional patent application No. 62/352,477 entitled "Connecting Tube" filed Jun. 20, 2016; copending U.S. provisional patent application No. 62/352,515 entitled "Cylindrical Combination Trigger/Head Valve" filed Jun. 20, 2016; copending U.S. provisional patent application No. 62/352,541 entitled "Depth Of Drive Mechanism" filed Jun. 20, 2016; and copending U.S. provisional patent application No. 62/352,547 entitled "Driver Blade" filed Jun. 20, 2016.

INCORPORATION BY REFERENCE

This patent application incorporates by reference in its entirety each of the following: copending U.S. provisional patent application No. 62/352,477 entitled "Connecting Tube" filed Jun. 20, 2016; copending U.S. provisional patent application No. 62/352,515 entitled "Cylindrical Combination Trigger/Head Valve" filed Jun. 20, 2016; copending U.S. provisional patent application No. 62/352,541 entitled "Depth Of Drive Mechanism" filed Jun. 20, 2016; and copending U.S. provisional patent application No. 62/352,547 entitled "Driver Blade" filed Jun. 20, 2016.

FIELD OF THE INVENTION

The present invention generally relates to the field of pneumatic tools, and particularly to pneumatic fastening tools, such as pneumatic nailers and pneumatic staplers.

BACKGROUND OF THE INVENTION

Pneumatic fastening tools have inadequate compressed air systems. They have difficulty in distributing air efficiently and effectively to various parts and portions of pneumatic fastening tools. Additionally, pneumatic fastening tools can leak compressed air from compressed air reservoirs and have difficulty providing compressed air at correct pressures and times to properly drive fasteners into workpieces. There is a strong need for a pneumatic fastening tool that can efficiently and reliably manage the use of compressed air.

SUMMARY OF THE INVENTION

A pneumatic fastening tool in its several and varied embodiments can use an integrated valve assembly having a cylindrical shape and optionally a feed piston pressure tube to achieve design and operation advantages such as, but not limited to, high drive cycle speeds, a low weight, ease of head valve assembly and trigger valve assembly maintenance, ergonomic balance in the hand of an operator and low recoil characteristics.

In embodiment, an integrated valve assembly can have a valve assembly housing which is substantially cylindrical. The valve assembly housing can have a head valve assembly having at least a portion disposed in the valve assembly housing. The head valve assembly can have a resting state and an actuated state. The valve assembly housing can also have a trigger valve assembly which can have at least a portion disposed in the valve assembly housing. The trigger valve assembly can also be configured to have a resting state and an actuated state. In an embodiment, the integrated valve assembly can have a reservoir line configured to feed a compressed air to the valve assembly housing to achieve and/or maintain the resting state of the head valve when the trigger valve assembly is in the resting state. The integrated valve assembly can also have an annulus chamber which is configured to receive a compressed air to achieve the resting state when the trigger valve assembly is in the resting state. Further, the integrated valve assembly can have a housing exhaust chamber configured to receive an exhaust air passing through the head valve assembly. In an embodiment, the head valve assembly can have a head valve axis and the trigger valve assembly can have a trigger valve stem axis which is collinear with the head valve axis.

In an embodiment, the valve assembly housing can have a reservoir line, a head valve line and an annulus chamber through which compressed air can be fed to move the valve head body into a resting state and maintain that resting state configuration when the trigger valve assembly is also in a resting state. In an embodiment, a reservoir line can be configured to feed a compressed air to the valve assembly housing to achieve the resting state. The head valve line can be configured to feed a compressed air to an annulus chamber of the valve assembly housing to achieve the resting state. The pneumatic fastening tool can have an annulus chamber that is substantially circular and configured to provide compressed air to maintain the position of the head valve body when the head valve assembly is in the resting state. In an embodiment, the integrated valve assembly can have a housing exhaust chamber configured to allow for the flow of exhaust air passing through the head valve assembly.

In an embodiment, the pneumatic fastening tool can have a compressed air reservoir and an integrated valve assembly which can have a valve assembly housing which is substantially cylindrical in which the integrated valve assembly can have a head valve assembly that has a head valve body. The head valve body can sealably engage an exhaust seal when the head valve assembly is in an actuated state. A trigger valve assembly can have a trigger valve stem assembly. In an embodiment, the pneumatic fastening can have an annulus chamber formed into a portion of the valve assembly housing. The annulus chamber can be configured to provide compressed air to at least a portion of the head valve body when the head valve body is in a resting state. A reservoir line can be formed into at least a portion of the valve assembly housing and configured to provide compressed air to the annulus chamber.

When the head valve assembly is in a resting state at least a portion of the head valve can form a seal with at least a portion of the a pressure reservoir chamber preventing a flow of compressed air into the compressed air inlet port. In an embodiment, the pneumatic fastening tool can have a compressed air reservoir, a pneumatically powered fastener driver system and an integrated valve assembly.

In an embodiment, the pneumatic fastening tool can have a reservoir line formed into at least a portion of the valve assembly housing. The reservoir line can be configured to provide compressed air to an annulus chamber formed into a portion of the valve assembly housing and the annulus chamber can be configured to provide compressed air to at least a portion of the head valve body when in a resting state.

In an embodiment, the pneumatic fastening tool can have an exhaust seal and a compressed air inlet port. A portion of the head valve can seal against the exhaust seal when the head valve assembly is in the actuated state which can inhibit the flow of exhaust air through the head valve assembly. The pneumatic fastening tool can also have at least one of an exhaust opening formed in the head valve and can have an exhaust line formed into a portion of the valve assembly housing. An exhaust air can flow through the exhaust opening when the head valve assembly is in a resting state.

In an embodiment, the pneumatic fastening tool can have a head valve which has a substantially circular circumference and an exhaust seal which has a substantially circular circumference. The exhaust seal can be housed by the valve assembly housing that is substantially cylindrical. A substantially tubular housing exhaust chamber can be formed into at least a portion of the valve assembly housing.

In an embodiment, a method of controlling a pneumatic fastening tool can have the steps of providing a compressed air reservoir, as well as providing an integrated valve assembly having a valve assembly housing which is substantially cylindrical and which is configured to house at least a portion of a head valve assembly having a head valve and a head valve body and at least a portion of a trigger valve assembly. Compressed air can be provided to at least a portion of the head valve body through a passage formed in the valve assembly housing to achieve a resting state of the head valve assembly in which the compressed air exerts a force upon a portion of the head valve body. The force upon the head valve body can cause a seal to be formed between at least a portion of the head valve assembly and at least a portion of the compressed air reservoir to block compressed air from flowing through the compressed air inlet port when the head valve assembly is in the resting state.

The method of controlling a pneumatic fastening tool can also have the steps of opening the stem exhaust port at least in part and purging the trigger valve assembly through the stem exhaust port which transitions the trigger valve assembly from a resting state to an actuated state. Compressed air can be applied to the head valve body which moves the head valve body from a resting configuration to an actuated configuration. Compressed air can also flow through a compressed air inlet port provide a force to drive a fastener.

In an embodiment, the method of controlling a pneumatic fastening tool can also have the steps of closing the stem exhaust port at least in part and feeding the compressed air though a first portion of the valve assembly housing to move the valve head body to its resting configuration, while exhausting the exhaust air through a second portion of the valve assembly housing. The method of controlling a pneumatic fastening tool can also have the steps of: providing an annular head valve guide having an inner guide which is at least in part formed in the valve assembly housing and which guides at least in part a movement of the head valve body; and guiding the movement of the head valve body.

BRIEF DESCRIPTION OF THE DRAWINGS

The present technology in its several aspects and embodiments solves the problems discussed above and significantly advances the technology of pneumatic fastening tools. The present technology can become more fully understood from the detailed description and the accompanying drawings, wherein.

Herein, like reference numbers in one figure refer to like reference numbers in another figure.

DETAILED DESCRIPTION OF THE INVENTION

The technology described herein can be used for a variety of pneumatic fastening tools and/or devices such as, but not limited to, nailers, roofing nailers, coil roofing nailer, finishing nailers, riveters, staplers, industrial staplers, or fine wire staplers. In an embodiment the pneumatic fastening tool 1 can drive fasteners such as, but not limited to, nails having a length in a range of from 0.25 inch to 2.0 inch or longer, such as 0.75 inch, 1 inch, 1.75 nails, or longer nails. In an embodiment, the use of feed piston pressure tube 420 (FIG. 3) and an integrated valve assembly 600 (FIG. 3) having a cylindrical shape can achieve a number of design and operation advantages such as, but not limited to a high drive cycle speeds, a weight of 5.5 lbs or less with ergonomic balance in the hand of an operator during use and low recoil characteristics resulting from component location, weight distribution, as well as the configuration moving masses.

Numeric values and ranges herein, unless otherwise stated, also are intended to have associated with them a tolerance and to account for variances of design and manufacturing. Thus, a number can include values "about" that number. For example, a value X is also intended to be understood as "about X". Likewise, a range of Y-Z, is also intended to be understood as within a range of from "about Y-about Z". Unless otherwise stated, significant digits disclosed for a number are not intended to make the number an exact limiting value. Variance and tolerance is inherent in mechanical design and the numbers disclosed herein are intended to be construed to allow for such factors (in non-limiting e.g., ±10 percent of a given value). Likewise, the claims are to be broadly construed in their recitations of numbers and ranges.

Additionally herein geometric references are intended also to be construed to account for variance, for example the term "circular" is intended to encompass "substantially circular", "generally circular", or other reasonable variations in the context of the embodiments disclosed herein. Likewise the term "cylindrical" is intended to encompass "substantially cylindrical", "generally cylindrical", or other reasonable variations in the context of the embodiments disclosed herein.

Figure 1:
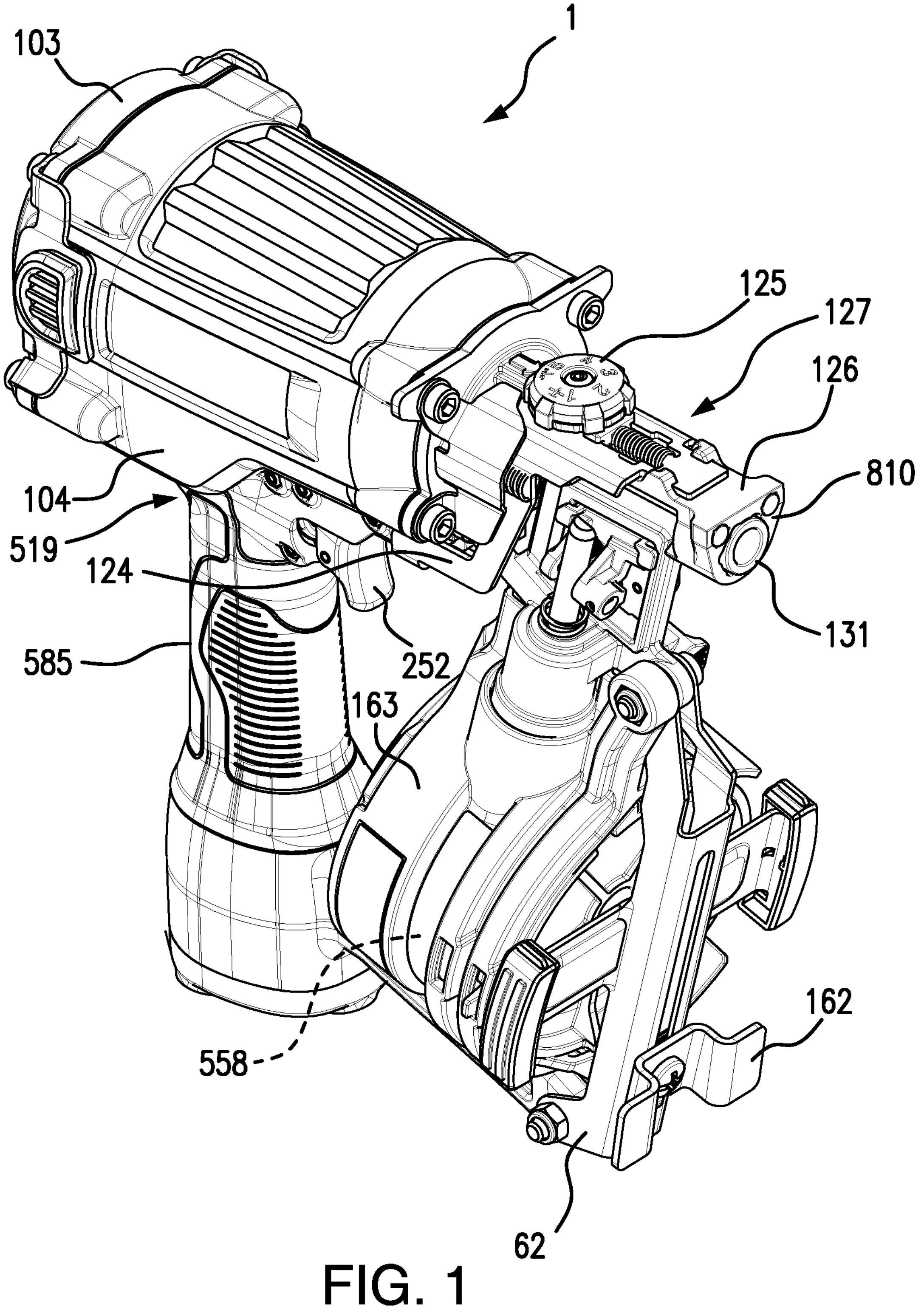
FIG. 1 is a perspective view of a pneumatic fastening tool showing the trigger mechanism.

The embodiment of the pneumatic fastening tool 1 of FIG. 1 shows a handle 585 which can be gripped by an operator, as well as the depth adjust mechanism 127 by which the operator can set a drive depth of a fastener which can be fed for driving from the feed canister 163. In an embodiment, the upper contact arm 124 can be part of a contact trip assembly which can have a contact pad 810 which can contact the workpiece and which can slide along nose 131. The housing 104 can have one or more ports for a compressed air feed and one or more exhaust ports to purge exhaust air. The pneumatic fastening tool 1 can have a handle 585 having a handle top end 519 to which the housing 104 can be coupled.

FIG. 1 also shows a depth adjust mechanism 127 which optionally can be adjusted by a thumb wheel 125. The thumb wheel 125 can be adjusted by an operator to drive a depth adjust cam that can set a fastener drive depth. Rotating the thumb wheel 125 can move the lower contact arm 126 and/or contact pad 810 to a desired position toward or away from a workpiece. In an embodiment, movement of the lower contact arm 126 by contact with a workpiece can also move the upper contact arm 124 and position a contact pin 870 (FIG. 5B) in a actuated position such that when a trigger 252 is actuated the trigger can cause a fastener to be driven. In an embodiment, if the contact pin 870 is not in an actuated position, the pneumatic fastener 1 will be prevented from driving a fastener into a workpiece.

Figure 3:
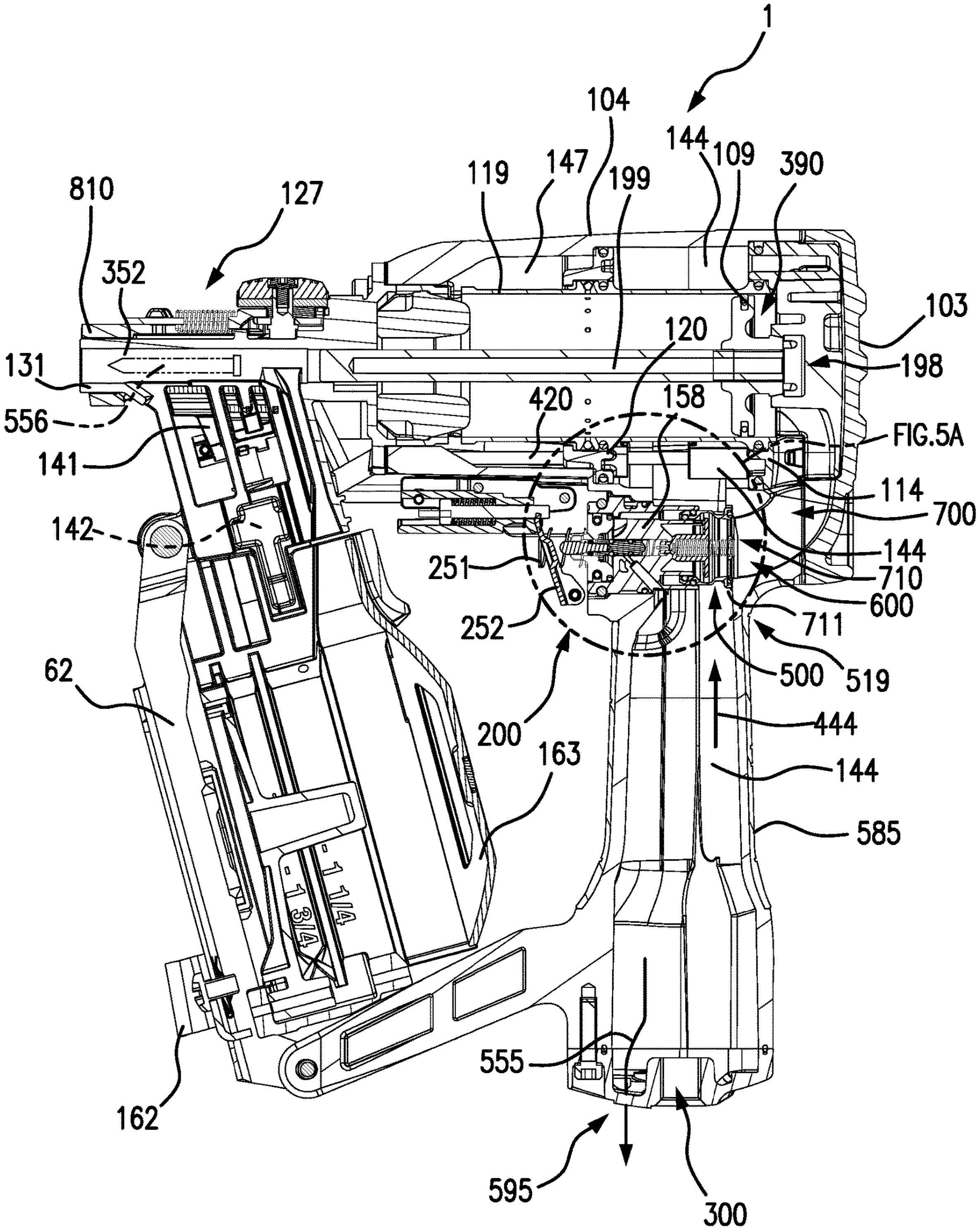
FIG. 3 is a sectional view of the pneumatic fastening tool showing an integrated valve assembly.

The pneumatic fastener 1 can have a feed canister 163 which can at least in part contain a coil of fasteners 558 which can be fed from the feed canister 163 to the drive channel 352 (FIG. 3). Optionally, a canister spine 62 can have a shingle guide 162 can be used facilitate an operator's ease of aligning the pneumatic fastener 1 to properly fasten a shingle to a surface.

FIG. 1 shows an upper contact arm 124 and a lower contact arm 126. The upper contact arm 124 and lower contact arm 126 can be part of a contact trip assembly. The contact trip assembly can also have a contact pad 810 which contacts the workpiece. The contact pad 810 can slide along the nose 131. Additionally, the contact pad 810 can directly, or by an intermediate linkage, move the upper contact arm 124. Movement of the contact arm 124 can move a trigger pin 850 (FIG. 5B) to a configuration to allow for triggering of the trigger valve assembly 200 upon a simultaneous actuation of the trigger 252 by an operator.

Figure 2:
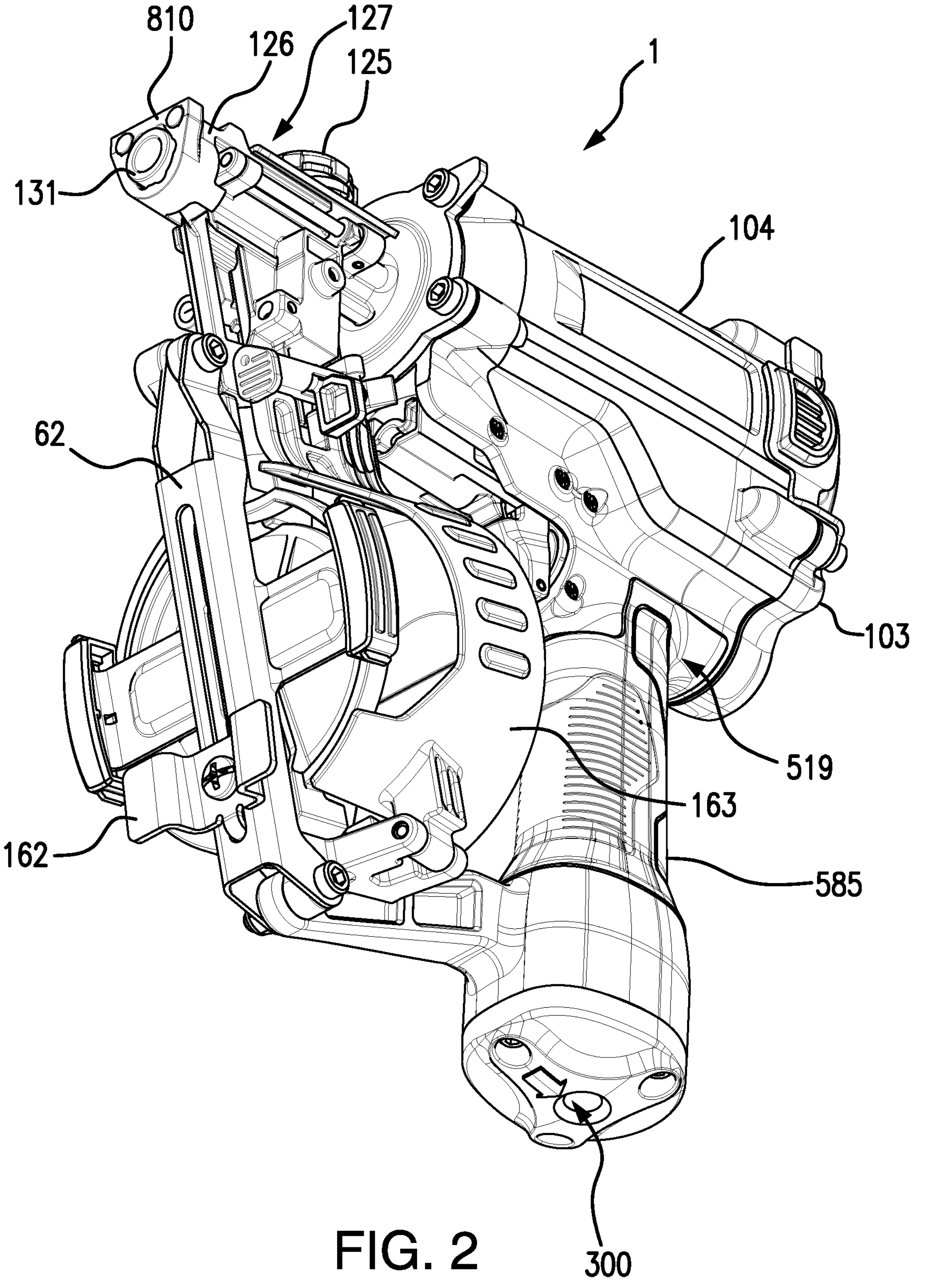
FIG. 2 is a perspective view of the pneumatic fastening tool showing the compressed air connector.

FIGS. 2 and 3 show the handle 585 having a compressed air connector 300. A compressed air supply (not shown) can be attached to the compressed air connector 300 to provide compressed air 444 to actuate operations of the pneumatic fastening tool 1. The compressed air connector 300 can be a compressed air feed inlet to supply compressed air 444 to a pressure reservoir chamber 144. In an embodiment, the handle 585 can also have an outlet port 595 for exhaust air 555. The pressure reservoir chamber 144 can have a handle reservoir surface 711 against which a head valve assembly 500 can seal to achieve a resting state.

Figure 8:
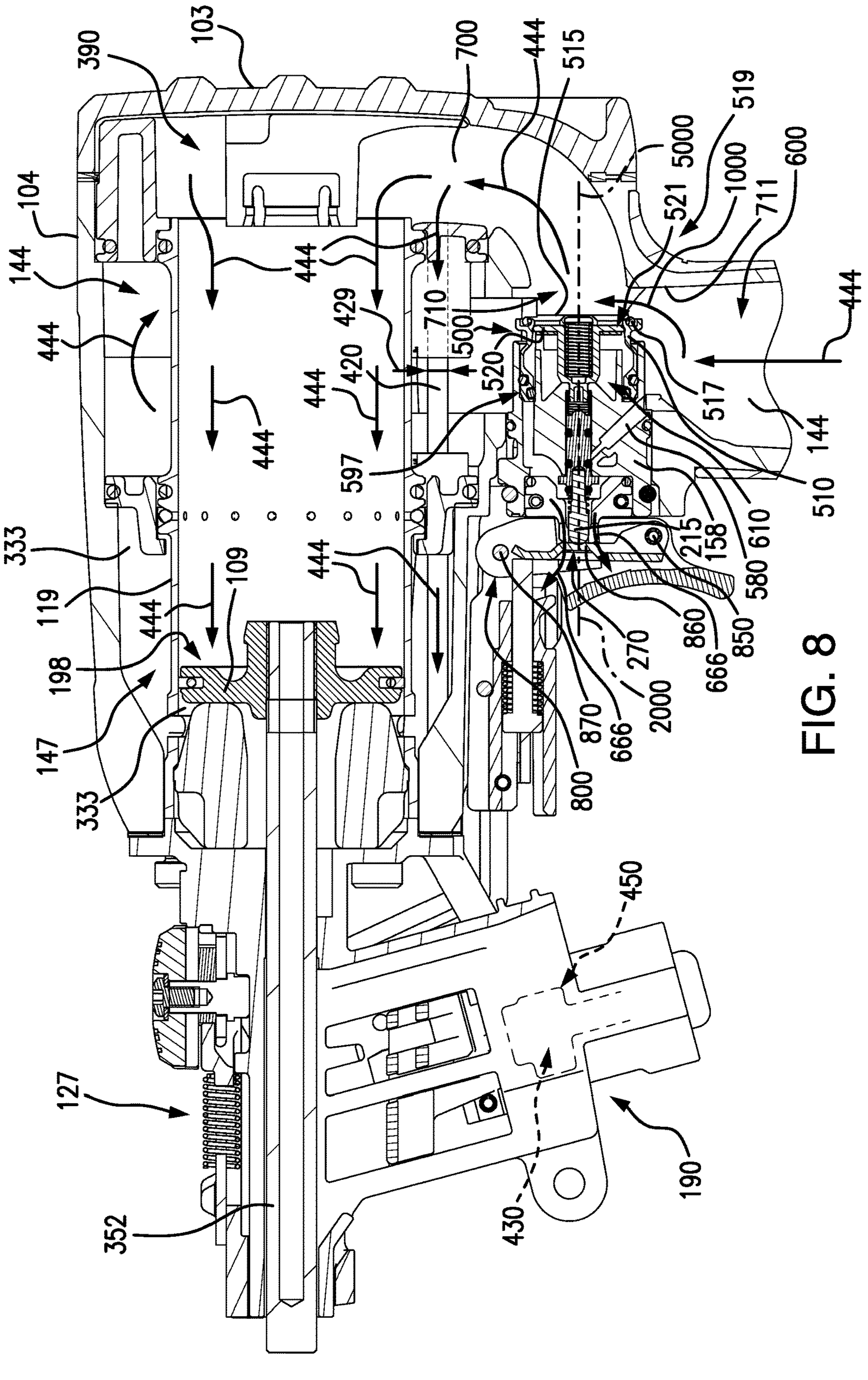
FIG. 8 is a sectional view showing the integrated valve assembly in an actuated state.

The "compressed air 444" in additional to its ordinary and customary meaning is defined herein as air having a pressure of 50 psig or greater which can actuate the drive assembly 198 and/or to actuate a head valve assembly 500 and/or actuate the movement of a feed piston 142. In an embodiment, the compressed air 444 can have a pressure in a range of 50 psig to 300 psig, or 70 psig to 220 psig, or 70 psig to 180 psig. In an embodiment, the compressed air can have a pressure in a range of 70 psig to 120 psig. Compressed air 444 can drive the drive piston 109 and can also be fed to the feed piston pressure tube 420 to actuate the movement of the feed piston 142 and/or pressurize a feed piston chamber 450 (FIG. 8).

Figure 5A:
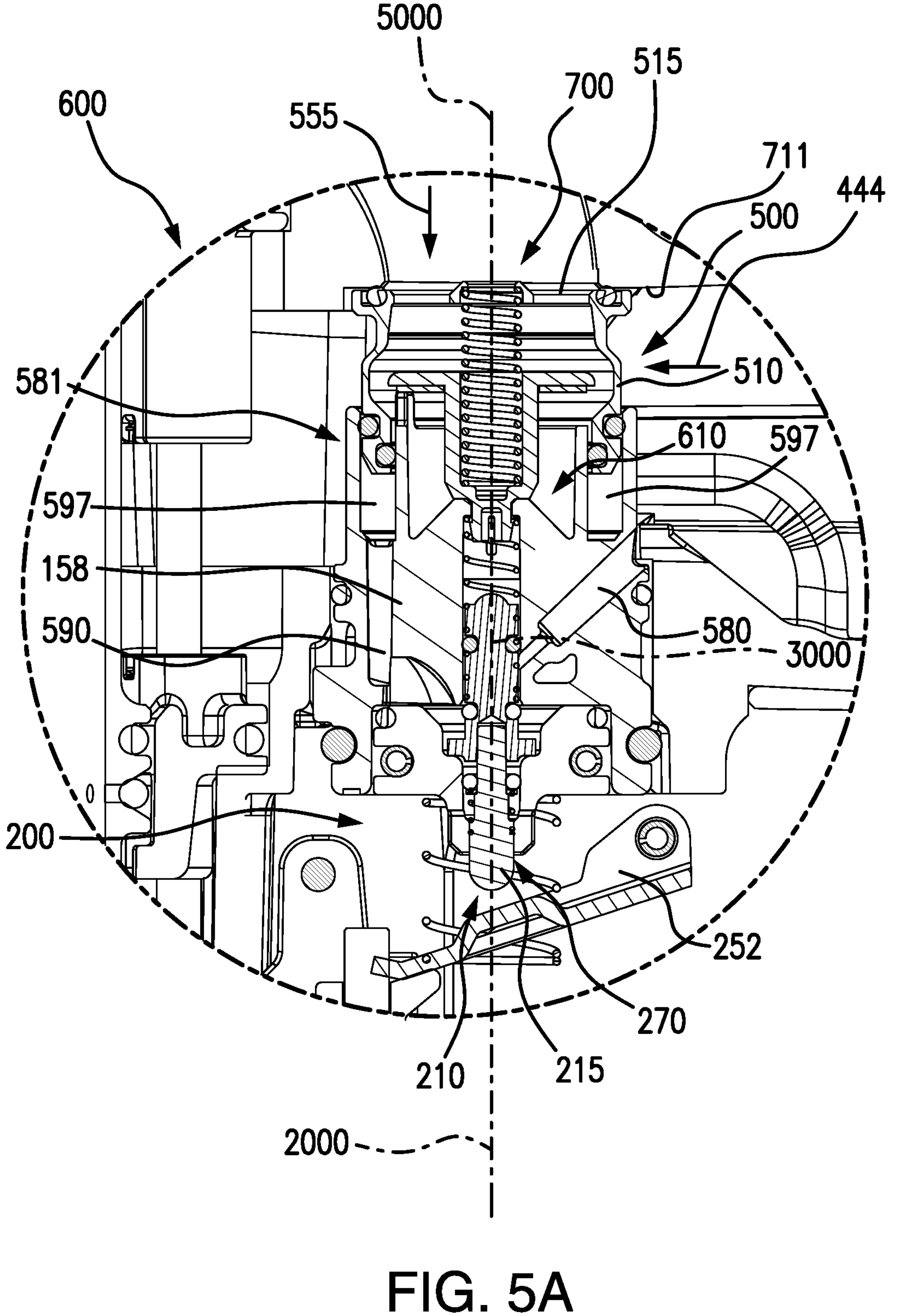
FIG. 5A is a sectional view of the integrated valve assembly.

In an embodiment, the pressure reservoir chamber 144 of the handle 585 can feed compressed air 444 to the over-piston chamber 390 chamber. Additionally, the portion of the pressure reservoir chamber 144 of the handle 585 can feed compressed air 444 to the integrated valve assembly 600, such as for example through a reservoir line 580 (FIG. 5A).

FIG. 3 shows an integrated valve assembly 600 having a valve assembly housing 158. The integrated valve assembly 600 can be configured proximate to the handle top end 519. FIG. 3 shows the integrated valve assembly 600 in its resting state blocking the flow of compressed air 444 so that the compressed air 444 cannot flow into the compressed air inlet port 710 of snorkel air passage 700. In an embodiment, snorkel air passage 700 can be a conduit having a portion which can be curved. The curved portion of the snorkel air passage 700 can optionally and in nonlimiting example have a curved shape analogous to a portion of a snorkel. When the integrated valve assembly 600, is in the resting state, the compressed air 444 and cannot actuate the drive assembly 198. In an embodiment, the drive assembly 198 can have a drive piston 109 and a driver blade 199 coaxial with driver cylinder 119. FIG. 3 shows the trigger valve assembly 200, the trigger 252 and trigger spring 251 in the resting state.

FIG. 3 also shows various chambers for controlling the compressed air 444, the plenum air 333 and exhaust air 555. The actuation of the drive assembly 198 and the feed piston 420 can be driven by a compressed air 444 flow. The flow of compressed air 444 can be controlled in a resting state by feeding the compressed air 444 to pressurize a pressure reservoir chamber 144. In the embodiment of FIG. 3 the pressure reservoir chamber 144 includes a portion of the handle 585 volume as well as volume between the reservoir bulkhead 114 and the plenum bulkhead 120 surrounding a portion of the driver cylinder 119.

"Plenum air 333" is the air controlled in the plenum chamber 147 and/or within the driver cylinder 119 between the driver piston 109 and the nose end of the driver cylinder 119. "Plenum air 333", is not within the definition of "compressed air 444" herein.

"Exhaust air 555" is air which is exhausted from the pneumatic fastening tool, such as "exhaust air 555" which can exit through the outlet port 595 of handle 585 and/or through housing exhaust chamber 610 and/or other exhaust passage or port. "Exhaust air 555" is not within the definition of "compressed air 444" herein.

The housing 104 can contain an over-piston chamber 390, a drive assembly 198 which can have a cylinder 119 which can at least in part guide a drive piston 109 having a driver blade 199. The driver blade 199 can be coaxial with the cylinder 119. The trigger 252 can trigger a drive piston 109 to drive a fastener. Upon actuation of the trigger 252, pneumatic pressure can cause the drive piston 109 to drive the driver blade 199 to drive a fastener into a workpiece. A cap 103 attached to the housing 104 can cover the over-piston chamber 390.

The pressure reservoir chamber 144, over piston chamber 390 and plenum chamber 147 are also shown in a resting and/or exhausting state. In an embodiment, the resting state for the pressure reservoir chamber 144, over piston chamber 390 and plenum chamber 147 is achieved when the air within these chambers is exhausted over an exhaust time period. In an embodiment, the exhaust time period begins when the head valve assembly 500 achieves its resting state sealed with the handle reservoir surface 711.

A feed piston pressure tube 420 can pass through a reservoir bulkhead 114 and a plenum bulkhead 120. When the trigger valve assembly 200 and the head valve assembly 500 achieve an active state (FIG. 8), the compressed air 444 can be fed to the drive assembly 198 so that the driver blade 199 can drive a fastener 556 through drive channel 352 into a workpiece. Further, the feed piston pressure tube 420 can provide compressed air 444 to retract a feed piston 142 and feed pawl 141 to create a distance of the feed pawl 141 from the fastener 556 at the moment it is driven there by reducing misfires.

Figure 4A:
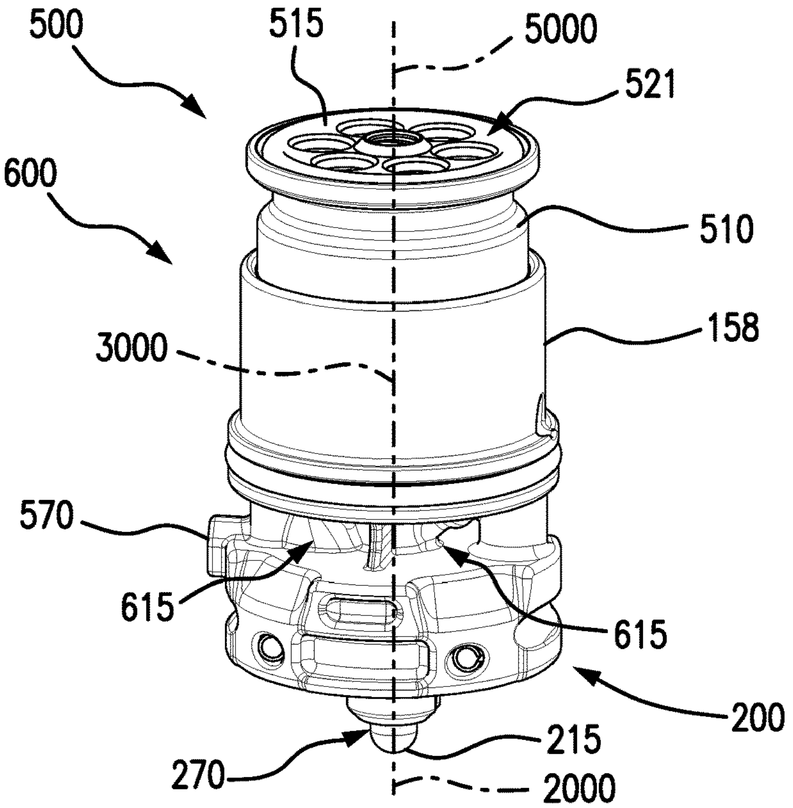
FIG. 4A is a perspective view of the integrated valve assembly showing the head valve assembly.

FIG. 4A shows the integrated valve assembly 600 in a resting state. The integrated valve assembly 600 can be the circular and/or substantially tubular shape of the valve assembly housing 158. The head valve assembly 500 can have a valve body 510 and a head valve 515 with the exhaust openings 521. At least a portion of the valve body 510 can be within the valve assembly housing 158.

Optionally, an assembly key 570 can be used to ensure a the circular and/or substantially tubular valve assembly housing 158 and/or integrated valve assembly 600 has a proper orientation with respect to orienting the reservoir line 580 to receive compressed air 444 and/or orienting one or more of the housing exhaust port 615 for the flow of exhaust air 555. FIG. 4A shows that each of the head valve assembly 500, the valve assembly housing 158, the trigger valve assembly 200 and the integrated valve assembly 600 are of a circular and/or substantially tubular shape.

The integrated valve assembly 600 which has a cylindrical shape, and can house at least a portion of the head valve assembly 500 and at least a portion of the trigger valve assembly achieves superior geometric, performance and maintenance characteristics. In an embodiment the pneumatic fastening tool can achieve a small tool profile by using a valve assembly housing 158 which can have a small outer diameter 159 in a range of from 10 mm to 40 mm, such as 30 mm or less, or 25 mm or less, or 20 mm or less. In an embodiment the valve assembly housing 158 having a cylindrical shape achieves a housing purge path of 50 mm or less, or 25 mm or less for air purged from the trigger when the trigger valve assembly 200 is actuated. The valve assembly housing 158 having a cylindrical shape achieves a housing exhaust path of 50 mm or less, or 25 mm or less for exhaust air 555 (FIG. 8) through the valve assembly housing 158.

The cylindrical shape of the integrated valve assembly 600 achieves an ease of maintenance and replacement of the valve assembly housing 158 by an operator which can result in an integrated valve assembly 600 replacement time by the operator of 5 minutes or less. Specifically, the cylindrical shape of the integrated valve assembly 600 makes it very easy for an operator to slide a used or damaged integrated valve assembly 600 out of the pneumatic fastening tool 1 for maintenance or replacement. In an embodiment, the integrated valve assembly 600 can be provided as a part in a kit for replacing the integrated valve assembly 600 and/or maintaining the tool.

FIG. 4A also shows the proximal trigger stem 215 in the rest position sealing closed the stem exhaust port 270. In an embodiment, the trigger valve assembly 200 can have a trigger valve stem axis 2000 collinear with the proximal trigger stem 215.

Figure 4B:
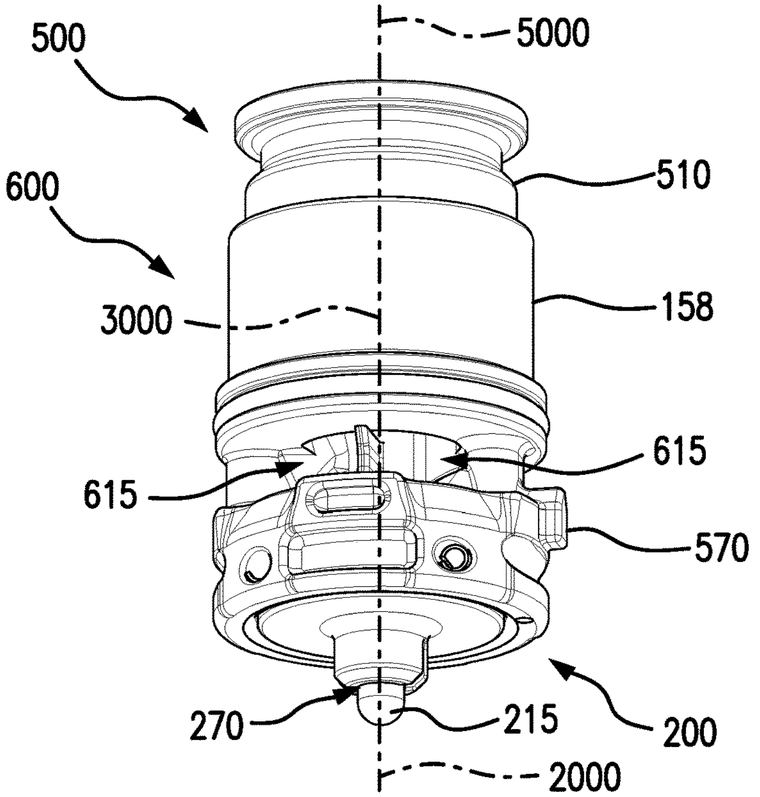
FIG. 4B is a perspective view of the integrated valve assembly showing the trigger valve assembly.

FIGS. 4A and 4B show a number of housing exhaust ports 615 for the flow of exhaust air 555 from the housing exhaust chamber of the valve assembly housing 158. FIGS. 4A and 4B also show the assembly key 570 which can be used to ensure proper orientation of the cylindrical integrated valve assembly 600 during assembly of the pneumatic fastening tool 1. FIG. 4B also shows that the head valve axis 5000, trigger valve stem axis 2000 and the integrated valve assembly axis 3000 are collinear with one another. As a result of the collinear configuration of the 5000, 2000 and 3000 axis, an integrated valve assembly 600 which is compact, cylindrical and has a small outer diameter 159 (FIGS. 6A and 6B) can be achieved. FIG. 5A is a sectional view of the integrated valve assembly 600 that has a cylindrical shape and shows a head valve assembly 500, the trigger valve assembly 200 and the trigger valve assembly 252.

The head valve assembly 500 can support the head valve 515 and the head valve body 510 can be slideably coupled with the annular head valve guide 581. In an embodiment, the head valve body 510 and/or head valve 515 can have a portion with as substantially circular shape and/or circumference which can seal against an exhaust valve 520 which can also have as substantially circular shape and/or circumference.

FIG. 5A shows the head valve assembly in a resting state in which a portion of head valve body 510 is sealed against the handle reservoir surface 711 blocking the flow of compressed air 444 from entering the snorkel air passage 700. The valve assembly housing 158 can have a reservoir line 580 to provide compressed air 444 flow through a head valve line 590 to an annulus chamber 597 which can be pressurized to achieve or maintain a resting state configuration of the head valve assembly 500.

When the integrated valve assembly 600 is in the resting state, a flow of exhaust air 555 can exit through a housing exhaust chamber 610 of the valve assembly housing 158. The trigger valve assembly 200 can have a trigger valve stem assembly 210 and a stem exhaust port 270 which can be triggered by actuating the trigger 252.

Figure 5B:
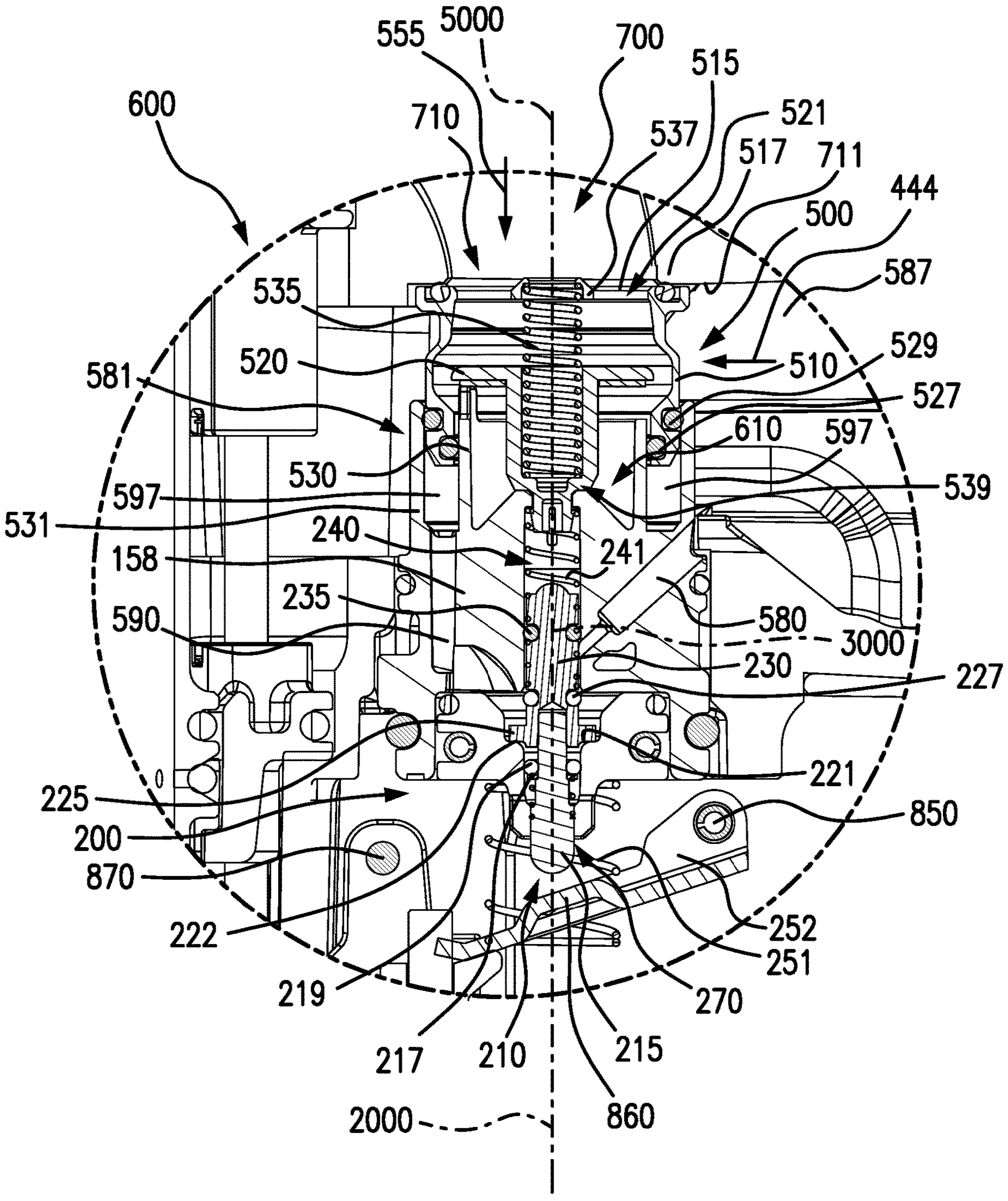
FIG. 5B is a detail sectional view of the integrated valve assembly.

FIG. 5B shows the integrated valve assembly 600 in a resting state. The integrated valve assembly 600 can have a trigger valve assembly 200 and a head valve assembly 500 that are at least in part housed in a valve assembly housing 158. The integrated valve assembly 600 can have a stem bore 240 configured to house and/or surround at least a portion of a trigger valve stem assembly 210. An annular head valve guide 581 can be configured to house at least a portion of the head valve assembly 500. In an embodiment, the head valve assembly 500 can have a head valve body 510. The head valve body 510 can optionally be sealed against the annular head valve guide 581 by a first head valve seal 586 and a second head valve seal 587. The head valve assembly can also have a head valve 515 which can be supported by the head valve body 510 and can have one or more exhaust openings 521.

The valve assembly housing 158 can have a reservoir line 580 to provide compressed air 444 through a head valve line 590 to an annulus chamber 597. The annulus chamber 597 can be pressurized to achieve or maintain a resting state configuration of the head valve assembly 500. The valve assembly housing 158 can also have a housing exhaust chamber 610 that receives a flow of exhaust air 555 which can flow from the valve assembly housing 158 through one or more of a housing exhaust port 615 (FIGS. 4A and 4B).

The annular head valve guide 581 can have an exhaust side guide rib 530 and an air feed side guide rib 531. The guide ribs 530 and 531 can guide the movement of the head valve body 510. In an embodiment, at least a portion of the head valve body 510 is configured between the exhaust side guide rib 530 and the air feed side guide rib 531. An exhaust rib seal 527, which can be an O-ring, seals the head valve body 510 and the exhaust side guide rib 530. Additionally, an air rib seal 529 which can be an O-ring, seals the head valve body 510 and the air feed side guide rib 531.

The head valve body 510 can bear a head valve 515 which can have one or more exhaust openings 521 (FIG. 4A). The head valve assembly 500 can also bear a head valve seal member 517 which seals against handle reservoir surface 711 blocking the flow of compressed air 444 from entering the compressed air inlet port 710 of the snorkel air passage 700. The head valve body 510 can be slideably coupled with the annular head valve guide 581 along the head valve axis 5000.

Figure 6A:
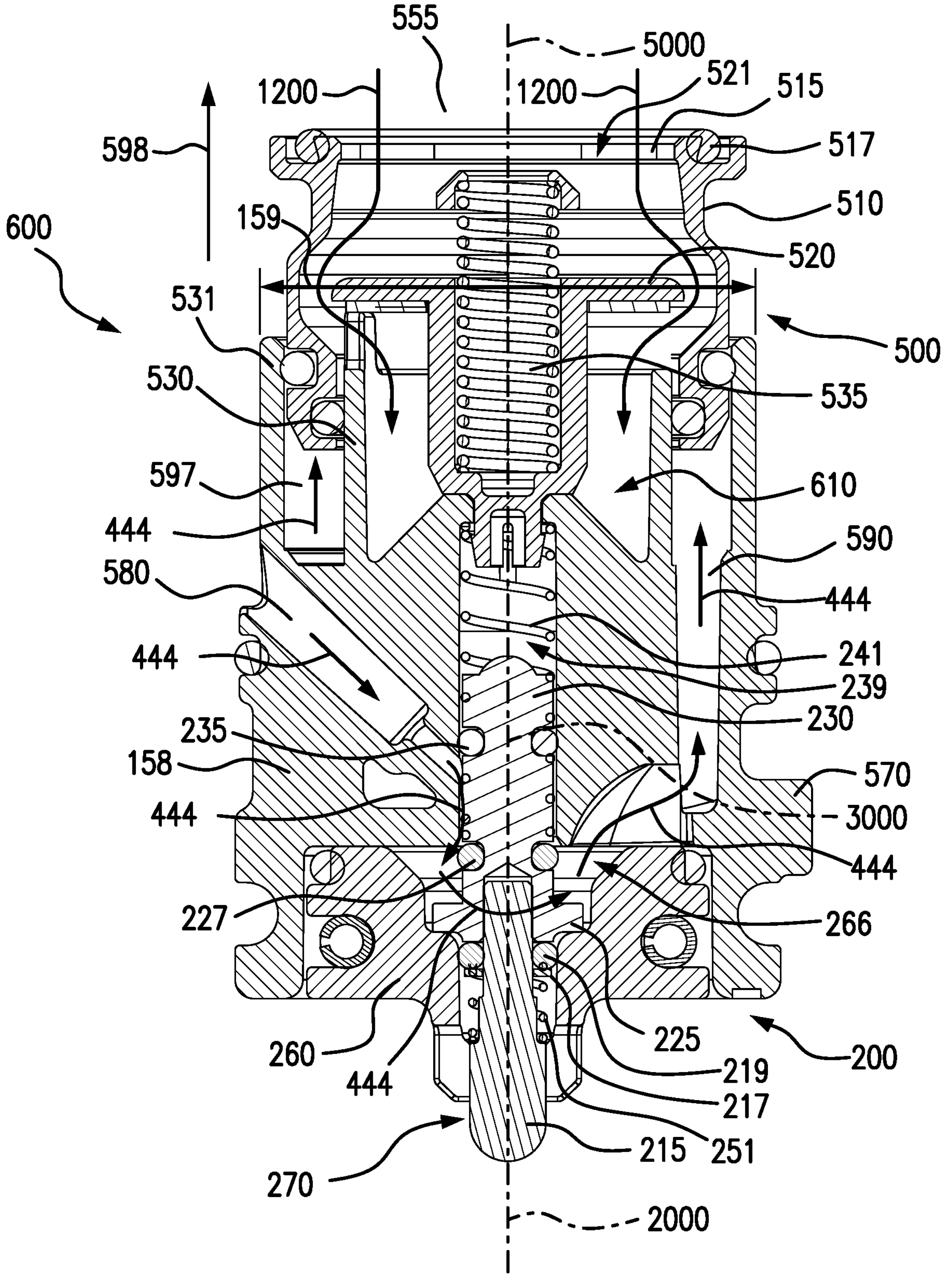
FIG. 6A is a sectional view of the integrated valve assembly showing the reservoir line.

As shown in FIG. 5B the head valve assembly 500 can have a head valve spring 535 which can be configured between an exhaust seal spring seat 539 and a head valve spring seat 537. The head valve spring 535 can be biased toward the snorkel air passage 700 and exert a force against the head valve 515 to achieve a resting state when the trigger valve assembly 200 is not actuated. In the resting state of the head valve assembly 500, the head valve 515 can be at a distance from the exhaust seal 520 which allows the exhaust air 555 to flow past the exhaust seal 520 as shown in FIG. 6A by the arrows showing the flow of exhaust air 555. In an embodiment, the exhaust seal 520 can be made of a plastic or polymer, such as urethane, to sealingly engage with the head valve body 510 and/or head valve 515. The head valve body 510 and/or head valve 515 can be made from a plastic, metal, composition, or other material, such as plastic or brass.

In an embodiment, the trigger valve assembly 200 can have a stem exhaust port 270 which the movement of the trigger valve stem assembly 210 can seal and unseal to selectively exhaust a flow of the purge air 666 (FIG. 6B) from the trigger valve assembly 200 in an actuated state. "Purge air 666" is air which is purged from the trigger valve assembly 200 to cause a differential pressure across the head valve 515 and initiate, achieve or maintain the actuated state of the head valve assembly 500. In an embodiment, the purge air 666 can be purged through a portion of the trigger valve assembly 200. In an embodiment, the trigger valve stem assembly 210 can reversibly move along a length of the stem bore 240 when transitioning from a resting to an actuated state. A stem bore spring 241 can be used to bias the trigger valve stem assembly 210 toward the trigger valve seal seat 222. The trigger valve stem assembly 210 can have a proximal trigger stem 215 coupled to distal trigger stem 230. The trigger valve stem assembly 210 can also have a trigger valve stem axis 2000. FIG. 4A also shows the trigger valve stem axis 2000 collinear with the head valve axis 5000 which achieves a compact design and increases the efficiency of the air flow into, through and from the integrated valve assembly 600. The trigger valve stem assembly 210 can optionally have a valve stem collar 225 to reversibly engage with the trigger valve seal face 221 of trigger valve seal seat 222. In another embodiment, the trigger valve stem axis 2000 collinear with the head valve axis 5000 can be parallel.

Figure 6B:
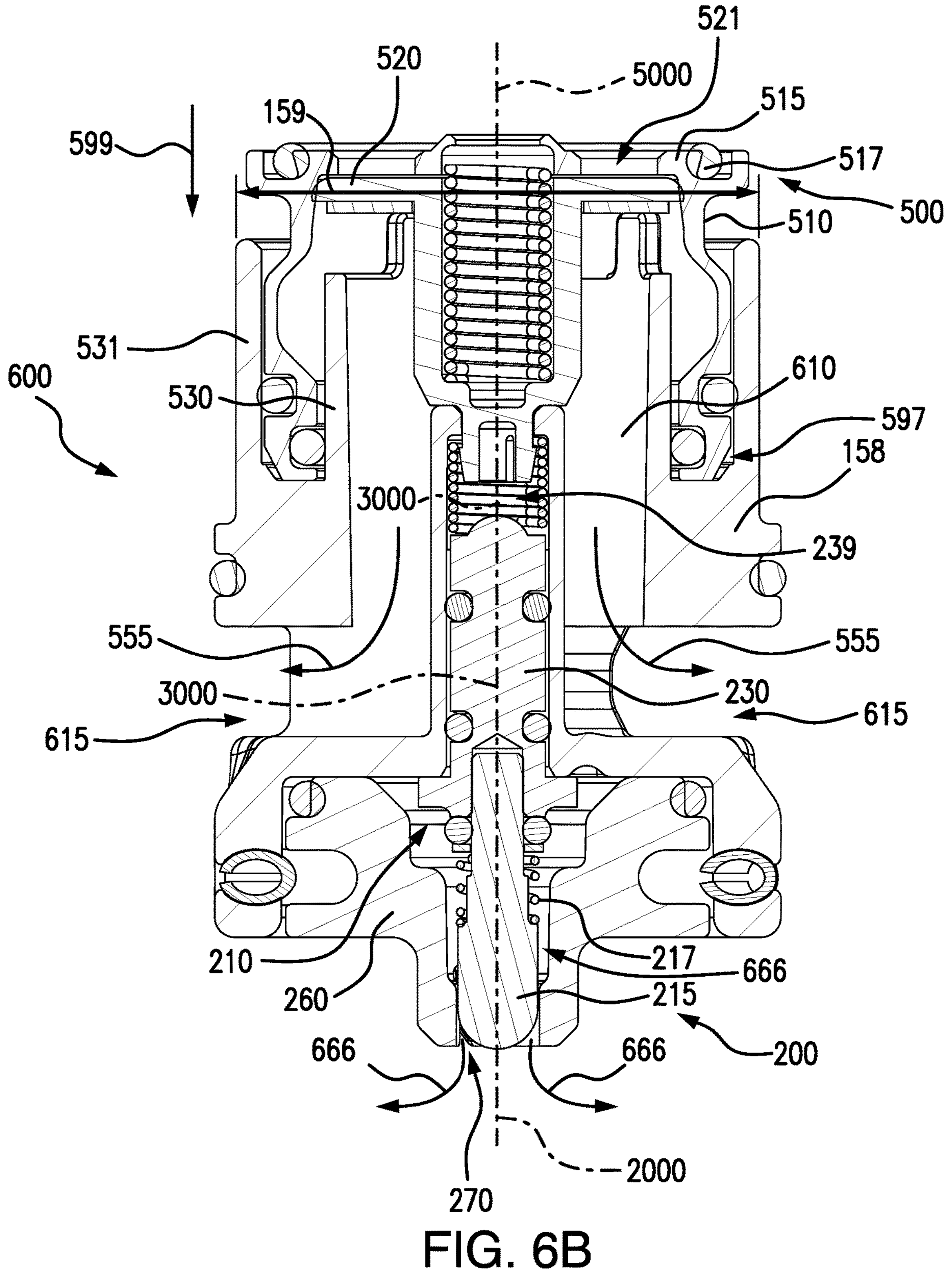
FIG. 6B is a sectional view of the integrated valve assembly showing the exhaust port.

FIG. 5B shows the valve stem collar 225 is formed as a protrusion of the distal trigger stem 230. The trigger valve stem assembly 210 can also have a trigger spring 251 which optionally can be coaxial to at least a portion of the proximal trigger stem 215 and seated against a proximal stem washer 217. The trigger spring 251 biases the proximal trigger stem 215 in a direction to seal the stem exhaust port 270. The trigger valve stem assembly 210 can have a number of seals to direct the flow of compressed air 444, exhaust air 555 and purge air 666 (FIG. 6B).

The distal trigger stem 230 has a distal trigger stem seal 235 and a middle trigger stem seal 227. In an embodiment, a stem bore gap volume 239 can be exhausted and/or maintained at ambient pressure. Optionally, the stem bore gap volume 239 can be exhausted through the housing exhaust chamber 610. In an embodiment, the stem bore gap volume 239 and distal trigger stem 230 and the distal trigger stem seal 235 can be free of a pressure greater than ambient, or greater than an exhaust pressure. In an embodiment, the stem bore gap volume 239, distal trigger stem 230 and the distal trigger stem seal 235 can each experience ambient pressure, or optionally an exhaust pressure, when the trigger valve assembly 200 is actuated.

The proximal trigger stem 215 can have a proximal trigger stem seal 219. In an embodiment, the seal 219 can seal the stem exhaust port 270 until the seal 219 is unseated from trigger valve seal seat 222.

Figure 7:
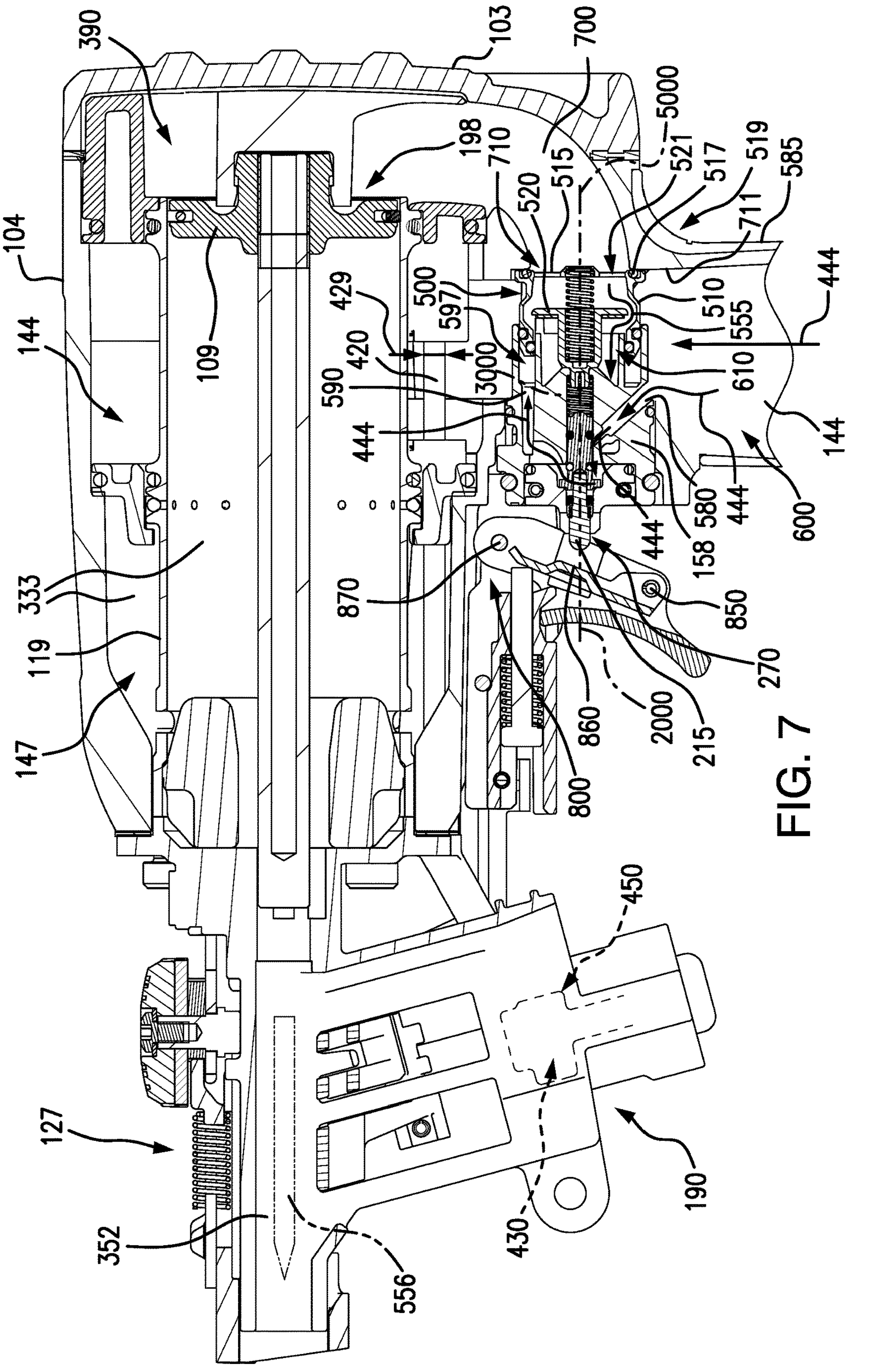
FIG. 7 is a sectional view showing the integrated valve assembly in a resting state.

The trigger valve assembly 200 of the integrated valve assembly 600 can be actuated by the actuating and/or triggering of a trigger 252 optionally having the trigger actuator 860 and also optionally a secondary triggering mechanism, such as a contact assembly 800 (FIG. 7). A trigger actuator 860 can require that the trigger pin 850 and the trigger 252 both be in an actuating position for the trigger actuator 860 to compress a trigger spring 251 and move a proximal trigger stem 215 to actuate the trigger valve assembly 200.

In an embodiment, the head valve spring 535 can provide and sustain a bias of pushing the head valve 515 toward the compressed air inlet port 710 in a range of 4 N to 20 N, such as 10 N to 16 N. In an embodiment the spring can provide an upward bias of 5 N to 15 N, such as 10 N, when the head valve assembly is in a resting configuration. In another embodiment, the spring can provide an upward bias of 9 N to 15 N, such as 10 N, when the head valve assembly is in a resting configuration. In another embodiment, the spring can provide an upward bias of 9 N to 15 N, such as 10 N, when the head valve assembly is in an actuated configuration. In another embodiment, the spring can provide an upward bias of 10 N to 25 N, when the head valve assembly is in an actuated configuration. In an embodiment, the head valve spring can provide a bias of 8 N to 12 N, e.g. 10 N, in a resting state which increases to 14-16 N, e.g. 15 N, as the head valve 515 is moved toward the exhaust seal 520. In an embodiment, the force of the compressed air can overcome the bias of the head valve spring 535 to begin, achieve and maintain the head valve assembly in an actuated configuration, as well as overcoming additional forces which can optionally be provided on the head valve assembly 500 from the annulus chamber, or the housing exhaust chamber 610. In an embodiment, the head valve assembly can achieve a fully actuated configuration by the compressed air exerting a force on the head valve body 510 to move the head valve 515 to toward the exhaust seal in a range of 10 N to 20 N, such as 14 N or 16 N.

FIG. 6A shows the integrated valve assembly 600 in its resting state. The trigger valve assembly 200 is shown in a resting state in which the proximal trigger stem 215 has sealed against the stem exhaust port 270 and opened a resting state flow path 266 which provides compressed air 444 to maintain the head valve body 510 in the resting configuration sealing the compressed air inlet port 710 (FIG. 3) from receiving compressed air 444 from the pressure reservoir chamber 144, or other source such as pressure reservoir chamber 144.

As shown in FIG. 6A, compressed air 444 can flow through the reservoir line 580 and be directed by the distal trigger stem seal 235 to flow along a portion of the distal trigger stem 230 and past middle trigger stem seal 227 along a portion of the valve stem collar 225 and into the head valve line 590 which feeds the annulus chamber 597. FIG. 6A shows the flow of the flow of compressed air 444 from the reservoir line 580 to the annulus chamber 597. The pressurization of the annulus chamber 597 imparts a sealing force 598 to maintain the head valve body 510 in the resting configuration.

FIG. 6A also shows the exhaust air 555 that can pass through one or a number of exhaust openings 521 and then around the exhaust seal 520 and into the housing exhaust chamber 610 and out through one or more of a housing exhaust port 615.

FIG. 6B is a sectional view of the integrated valve assembly 600 in an actuated state in which the trigger stem assembly 210 is in a trigger actuated configuration. The head valve assembly 500 is actuated by a trigger actuation of the trigger assembly 200. In the trigger actuated configuration, actuation of the trigger 252 can move the trigger valve stem assembly 210 against the bias of the trigger spring 251 and toward the head valve assembly 500. In FIG. 6B, the proximal trigger stem 215 has moved away from the stem exhaust port 270 opening the stem valve assembly 200 and allowing a flow of purge air 666 to flow through the stem exhaust port 270.

The exiting of the flow of purge air 666 lowers the pressure of the annulus chamber 597 because the compressed air 444 pressurizing the annulus chamber 597 is also purged, as purge air 666, through the stem exhaust port 270. The purging of the purge air 666 creates a pressure differential between the compressed air 444 pressure of the pressure reservoir chamber 144 and/or the reservoir chamber 145 which is at high pressure, such as 70 psig to 200 psig, and the annulus chamber 597 which in an trigger actuated state is at a low pressure, such as ambient pressure, or about 0 psig, or an exhaust pressure.

In an embodiment, the head valve assembly 500 can actuate when the housing exhaust chamber has a pressure of 25 psig or less, or 15 psig or less, or 8 psig or less. In an embodiment, the head valve assembly 500 can actuate when the housing exhaust chamber has a pressure of 25 psig or less, or 15 psig or less, or 8 psig or less, when the compressed air has a pressure of 70 psig or greater, such as 120 psig.

As a result of the differential pressure between the high-pressure the pressure reservoir chamber 144 and/or the pressure reservoir chamber 144 and the low-pressure annulus chamber 597, the compressed air 444 exerts a force that translated into the movement of the head valve body and head valve toward the exhaust seal 520.

In an actuated state, the head valve 515 in pressed against the exhaust seal 520 which obstructs the flow of compressed air through exhaust openings 521 and achieves the actuated state of the head valve assembly 500. In this actuated state of the head valve assembly 500, because the head valve 515 is sealed against and/or closed by contact with the exhaust seal 520, the compressed air 444 flows through the compressed air inlet port 710 and the snorkel passage into the over-piston chamber 390 to drive the driver piston. In an embodiment, the compressed air 444 also flows through a feed piston pressure tube 420 to achieve an actuated state of the feed piston assembly 190.

Figure 6C:
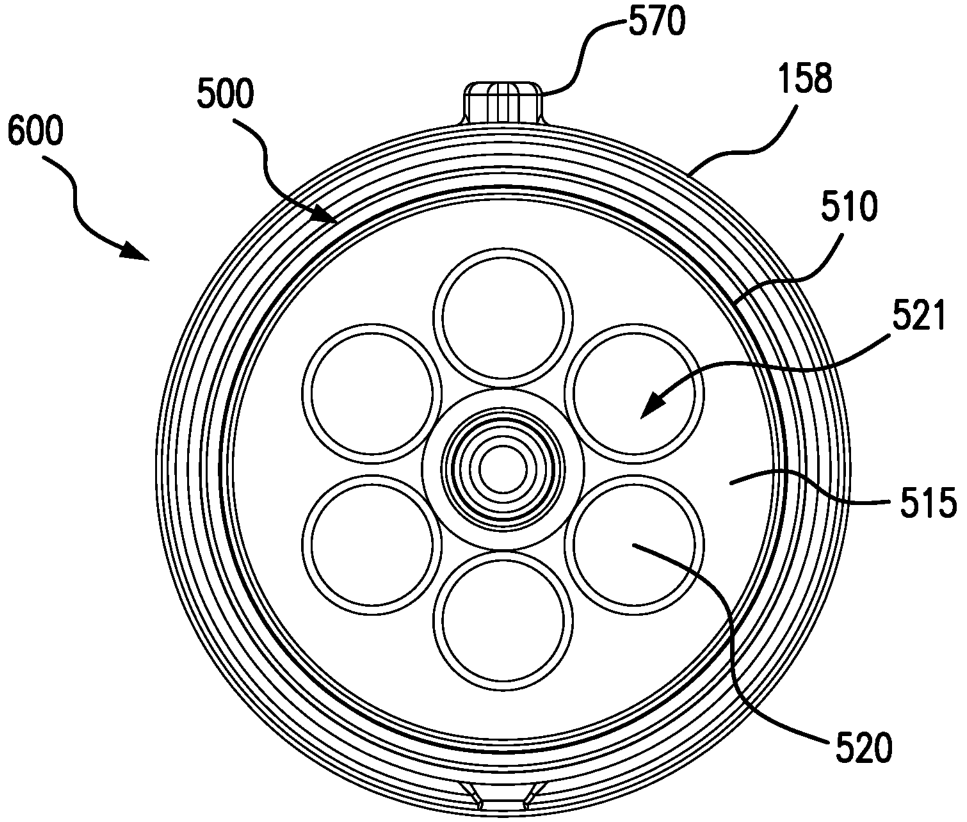
FIG. 6C is a cap end view of the head valve showing a number of exhaust openings.

FIG. 6C shows the exhaust seal 520 and the head valve assembly 500 in an actuated state. When the head valve assembly 500 is in the actuated state, the head valve 515 is configured to be in sealing contact with exhaust seal 520.

FIG. 7 is a sectional view showing the integrated valve assembly 600 in a resting state blocking the flow of compressed air 444 shown by the flow of compressed air 444. FIG. 7 shows the head valve seal member 517 sealing the compressed air inlet port from receiving the flow of compressed air 444. In an embodiment, the head valve seal member 517 can press against the handle reservoir surface 711 forming a seal which achieves the resting state of the head valve assembly 500 and in conjunction with the head valve body 510 blocks the flow of compressed air 444 from reaching the compressed air inlet port 710 when the head valve assembly 600 is in the resting state.

FIG. 7 also shows the flow of compressed air 444 into the head valve line 590 pressurizing the annulus chamber 597 to achieve and/or maintain the head valve assembly 500 in the resting state. In the head valve assembly 500 resting state, the drive assembly 198 and the feed piston assembly 190 are also in a resting state. In the resting state, the drive cylinder 119, the snorkel air passage 700, plenum chamber 147, over-piston chamber 390, feed piston return chamber 450 and housing exhaust chamber 610 are each depressurizing and/or unpressurized to, or close to, ambient pressure, or about 0 psig, and are free of the flow of compressed air 444 and free of compressed air 444.

In this configuration compressed air 444 from the pressure reservoir chamber 144, or other source such as the pressure reservoir chamber 144, is fed through the reservoir line 580 to pass through a head valve line 580 to pressurize the annulus chamber 597 and move and maintain the head valve assembly 500 in its resting state.

In the resting state, the head valve body 510 is configured to seal a compressed air inlet port 710 preventing a flow of compressed air 444 through the snorkel passage 700 to the over-piston chamber 390. In an embodiment the head valve body 510 forms a seal with at least a portion of the a pressure reservoir chamber 144 preventing a flow of compressed air into the compressed air inlet port 710.

In an embodiment, the head valve body 510 can have a head valve seal member 517, which can optionally be an O-ring.

FIG. 8 is a sectional view showing the integrated valve assembly 600 in an actuated state. In the actuated state, the annulus chamber 597 is purged and resulting pressure differential across the head valve 515 and head valve body 510 and the pressure from the compressed air 444 causes the head valve assembly 500 to reach an actuated state. When the head valve assembly 515 is in the actuated state, the compressed air 444 flows to each of the snorkel air passage 700, the over-piston chamber 390, drive assembly and drive cylinder 119 and the feed piston return chamber 450. In an actuated state, if both the contact pin 870 and trigger pin 850 are each in an actuated configuration, the trigger actuator 860 can actuate the integrated valve assembly 600 and trigger the driving of a fastener into a workpiece. In an embodiment, in order for the trigger valve assembly 200 to be actuated, both the trigger pin 850 and the trigger 252 must be in an actuated configuration at the same time.

A drive cycle speed of a pneumatic fastening tool can be a function of the trigger and head valve operation, piston return and feed system characteristics, compressed air supply and exhaustion. The integrated valve assembly 600 alone, or in combination with a feed piston pressure tube 420, supports a high drive cycle speed which achieves a drive frequency, of drives of the driver assembly 198, of 0 to 25 drives per second, which can also be characterized as 0 to 25 fasteners driven per second. In an embodiment, the pneumatic fastening tool can achieve a drive cycle speed of 14 to 25 drives per second, or of 14 to 25 drives fasteners driver per second. In another embodiment, the pneumatic fastening tool can achieve a drive cycle speed of 5 to 15 drives per second, or fasteners of 5 to 15 driven per second. In another embodiment, the pneumatic fastening tool can achieve a drive cycle speed of 6 to 12 drives per second, or of 6 to 12 fasteners driver per second. The use of the integrated valve assembly 600 alone, or in combination with a feed piston pressure tube 420, achieves a rapid drive cycle speed at which the nailer can be fired without a firing pause or delay caused by factors associated with the tool returning to a rest or pre-actuated state, such as exhausting air or mechanical transition from actuated to a resting and/or pre-firing state. In an embodiment, the drive cycle speed of a pneumatic fastening tool using compressed air 444 of 100 psig can achieve a drive cycle speed of 0 to 15, such as 12, 14 or 15, drives per second, or fasteners driver per second. In an embodiment, the pneumatic fastening tool 1 can have an integrated valve assembly 600, a compressed air 444 having a pressure of 70 psig or greater, a drive cycle speed of 10 drives per second and a weight of 6 lbs or less, such as 5.5 lbs or less, or 5 lbs or less.

This disclosure regards a pneumatic fastening tool and its many aspects, features and elements. Such an apparatus can be dynamic in its use and operation. This disclosure is intended to encompass the equivalents, means, systems and methods of the use of the pneumatic fastening tool and its many aspects consistent with the description and spirit of the apparatus, means, methods, functions and operations disclosed herein. Other embodiments and modifications will be recognized by one of ordinary skill in the art as being enabled by and within the scope of this disclosure.

The scope of this disclosure is to be broadly construed. The embodiments herein can be used together, separately, mixed or combined. It is intended that this disclosure disclose equivalents, means, systems and methods to achieve the devices, designs, operations, control systems, controls, activities, mechanical actions, dynamics and results disclosed herein. For each mechanical element or mechanism disclosed, it is intended that this disclosure also encompasses within the scope of its disclosure and teaches equivalents, means, systems and methods for practicing the many aspects, mechanisms and devices disclosed herein. The claims of this application are likewise to be broadly construed.

The description of the technology herein in its many and varied embodiments is merely exemplary in nature and, thus, variations that do not depart from the gist of the disclosure are intended to be within the scope of the claims and the disclosure herein. Such variations are not to be regarded as a departure from the spirit and scope of the disclosed technologies.

It will be appreciated that various modifications and changes can be made to the above described embodiments of the power tool as disclosed herein without departing from the spirit and the scope of the claims.

We claim:

1. A valve assembly, comprising:

a valve assembly housing which is substantially cylindrical and configured for selective insertion into a pneumatic fastening tool to achieve an installed state and selective removal out of the pneumatic tool to achieve an uninstalled state;

an annulus chamber having at least a portion formed into said valve assembly housing which is substantially cylindrical and which has an air feed side guide rib formed into the valve assembly housing and an exhaust side guide rib formed into the valve assembly housing;

a housing exhaust chamber having at least a portion formed at least in part from a surrounding portion of the exhaust side guide rib and a portion of the valve assembly housing and through which an exhaust air flows;

a housing exhaust port having at least a portion formed into said valve assembly housing and through which the exhaust air flows from the housing exhaust chamber;

a stem bore formed into a portion of the valve assembly housing which surrounds at least a portion of a trigger valve stem assembly when in the installed state;

a reservoir line formed into a portion of said valve assembly housing and configured to receive a compressed air which is fed through the reservoir line to the stem bore;

a head valve assembly having a head valve body having at least a portion inserted between the air feed side guide rib and the exhaust side guide rib when in an installed state and which has a sliding movement that is guided by the air feed side guide rib and the exhaust side guide rib when in an installed state and the head valve assembly having an exhaust opening through which the exhaust air flows to the housing exhaust chamber when in a resting state;

a trigger valve assembly surrounded at least in part by a portion of the valve assembly housing when in an installed state and having a distal trigger stem, and wherein at least a portion of the distal trigger stem is surrounded by the stem bore when in an installed state, wherein the valve assembly housing is selectively installed in a fastening tool to achieve the installed state, wherein the valve assembly housing is selectively removeable out of the fastening tool to achieve the uninstalled state, wherein the valve assembly housing is configured to bear at least a portion of the head valve assembly and at least a portion of the trigger valve assembly when the valve assembly housing is in the installed state and also when the valve assembly housing is in the uninstalled state.

2. The assembly according to claim 1, wherein the head valve assembly has a head valve axis and the trigger valve assembly has a trigger valve stem axis which is collinear with the head valve axis.

3. The assembly according to claim 1, wherein the annulus chamber is configured to receive the compressed air to achieve a resting state when the trigger valve assembly is in the resting state.

4. A pneumatic fastening tool, comprising:

a valve assembly which is selectively removable out of the pneumatic fastening tool and which has an installed state and an uninstalled state, a pressure reservoir chamber having a compressed air fed to the valve assembly when in an installed state;

a valve assembly housing having an annulus chamber having at least a portion formed into the valve assembly housing which is substantially cylindrical and which has an air feed side guide rib formed into the valve assembly housing and an exhaust side guide rib formed into the valve assembly housing;

a reservoir line formed into a portion of the valve assembly housing and configured to receive the compressed air which is fed to a head valve line formed into a portion of the valve assembly housing and configured to feed the compressed air to the annulus chamber;

a head valve assembly having a head valve and having a head valve body slidably inserted between the air feed side guide rib and the exhaust side guide rib when in an installed state and which has a movement that is guided by the air feed side guide rib and the exhaust side guide rib when in an installed state;

a compressed air inlet port against which a portion of the head valve body maintains a seal when the annulus chamber is pressured by the compressed air in a resting state and which is free of a seal against the compressed air inlet port when by a portion of the head valve body in an actuated state;

a housing exhaust chamber formed at least in part from a surrounding portion of the exhaust side guide rib and a portion of the valve assembly housing and through which a purge air flows when in an actuated state from the annulus chamber to exhaust through a housing exhaust port formed at least in part in a portion of the valve assembly housing;

a trigger valve assembly surrounded at least in part by a portion of the valve assembly housing when in an installed state and having a valve stem assembly at least in part surrounded by a stem bore formed in a portion of the valve assembly housing.

5. The pneumatic fastening tool according to claim 4, wherein the annulus chamber is configured to provide the compressed air to at least a portion of the head valve body when the head valve body is in a resting state.

6. The pneumatic fastening tool according to claim 4, further comprising:

a compressed air inlet port, wherein, when the head valve assembly is in the resting state, at least a portion of the head valve assembly is sealed against at least a portion of the pressure reservoir chamber preventing a flow of compressed air into the compressed air inlet port.

7. The pneumatic fastening tool according to claim 4, wherein when the head valve assembly is in an actuated state the exhaust air flow through the head valve assembly is inhibited.

8. The pneumatic fastening tool according to claim 4, further comprising:

at least one of an exhaust opening formed in the head valve and configured to feed the exhaust air to the housing exhaust chamber, wherein the housing exhaust chamber is formed into a portion of the valve assembly housing, and wherein the exhaust air flows through the exhaust opening when the head valve assembly is in the resting state.

9. The pneumatic fastening tool according to claim 4, wherein the annulus chamber is configured to provide the compressed air to maintain a position of the head valve body when the head valve assembly is in the resting state.

10. The pneumatic fastening tool according to claim 4, wherein the head valve has a substantially circular circumference, wherein the exhaust seal has a substantially circular circumference, and wherein the head valve and the exhaust seal form a seal when the head valve assembly is in the actuated state.

11. A method, comprising the steps of:

providing a pneumatic fastening tool;

providing a valve assembly housing which is substantially cylindrical and configured for selective insertion into the pneumatic fastening tool to achieve an installed state and selective removal out of the pneumatic tool to achieve an uninstalled state;

providing a trigger valve assembly surrounded at least in part by a portion of the valve assembly housing when in an installed state;

providing a stem bore formed into the valve assembly housing which surrounds at least a portion of a trigger valve stem assembly when in the installed state;

providing a reservoir line formed into the valve assembly housing and configured to receive a compressed air which is fed through the reservoir line to the stem bore;

providing a housing exhaust chamber having at least a portion formed at least in part from a surrounding portion of the exhaust side guide rib and a portion of the valve assembly housing and through which an exhaust air flows;

providing a head valve assembly having a head valve body having at least a portion inserted between the air feed side guide rib and the exhaust side guide rib when in an installed state and which has a sliding movement that is guided by the air feed side guide rib and the exhaust side guide rib when in an installed state and the head valve assembly having an exhaust opening through which the exhaust air flows to the housing exhaust chamber when in a resting state;

providing a cavity of the pneumatic fastening tool configured to receive the valve assembly housing to achieve the installed state;

sliding the valve assembly housing bearing the head valve assembly and bearing the trigger valve assembly into the cavity of the pneumatic fastening tool to selectively achieve the installed state which is selectively reversible by a removal of the valve assembly housing bearing the head valve assembly and bearing the trigger valve assembly by an operator to achieve the uninstalled state;

providing a compressed air to the reservoir line;

providing a trigger to selectively actuate the trigger valve assembly;

providing a drive piston configured to selectively drive a fastener when the trigger valve assembly is actuated;

feeding the compressed air through the reservoir line to a portion of the stem bore;

selectively achieving a resting state of the head valve assembly by feeding the compressed air to exert a force upon at least a portion of a head valve body;

forming a seal between at least a portion of the head valve assembly and at least a portion of the pressure reservoir chamber to block the compressed air from flowing through a compressed air inlet port when the head valve assembly is in the resting state;

selectively triggering the trigger valve assembly to achieve an actuated state;

selectively providing the compressed air to the drive piston to drive a fastener.

12. The method according to claim 11, further comprising the steps of:

allowing a flow of a purge air to flow through a stem exhaust port;

applying the compressed air to move the head valve body from a resting configuration to an actuated configuration;

flowing the compressed air through the compressed air inlet port; and driving a fastener.

* * * * *